United States Patent
Jennings et al.

(10) Patent No.: US 8,223,755 B2
(45) Date of Patent: *Jul. 17, 2012

(54) NODE REPUTATION BASED ON KNOWLEDGE OF PSTN CALLS

(75) Inventors: Cullen F. Jennings, Santa Cruz, CA (US); Jonathan David Rosenberg, Freehold, NJ (US)

(73) Assignee: Cisco Technology, Inc., San Jose, CA (US)

( * ) Notice: Subject to any disclaimer, the term of this patent is extended or adjusted under 35 U.S.C. 154(b) by 35 days.

This patent is subject to a terminal disclaimer.

(21) Appl. No.: 12/608,545

(22) Filed: Oct. 29, 2009

(65) Prior Publication Data
US 2010/0082828 A1    Apr. 1, 2010

Related U.S. Application Data

(63) Continuation-in-part of application No. 11/780,928, filed on Jul. 20, 2007.

(51) Int. Cl.
*H04L 12/28* (2006.01)
(52) U.S. Cl. ......... 370/353; 370/354; 370/400; 370/401
(58) Field of Classification Search .......... 370/351–354, 370/356, 386, 389, 392, 395.31, 395.52, 370/400, 401, 402, 494
See application file for complete search history.

(56) References Cited

U.S. PATENT DOCUMENTS

| | | | |
|---|---|---|---|
| 5,590,370 A | 12/1996 | Asthana et al. | 395/800 |
| 5,699,514 A | 12/1997 | Durinovic-Johri et al. | 395/188.01 |
| 6,012,144 A * | 1/2000 | Pickett | 726/26 |
| 6,088,683 A * | 7/2000 | Jalili | 705/26.8 |
| 6,295,575 B1 | 9/2001 | Blumenau et al. | 711/5 |
| 6,404,870 B1 | 6/2002 | Kia et al. | 379/144.01 |
| 6,529,501 B1 | 3/2003 | Zhao et al. | 370/353 |
| 6,674,850 B2 | 1/2004 | Vu et al. | 379/220.01 |
| 6,700,964 B2 * | 3/2004 | Schmid et al. | 379/189 |
| 6,950,652 B2 | 9/2005 | Janssen et al. | 455/419 |
| 6,961,334 B1 * | 11/2005 | Kaczmarczyk | 370/354 |

(Continued)

FOREIGN PATENT DOCUMENTS

EP    1 009 153 A1    6/2000

(Continued)

OTHER PUBLICATIONS

Seedorf, Jan; SIP Security: Status Quo and Future Issues; Dec. 27, 2006; 23rd Chaos Communication Congress; pp. 1-5.*

(Continued)

*Primary Examiner* — Robert Scheibel
*Assistant Examiner* — Mark A Mais
(74) *Attorney, Agent, or Firm* — Brinks Hofer Gilson & Lione

(57) ABSTRACT

A system may provide trust relationship information for a telephone number, where the trust relationship information may indicate whether one or more nodes consider a target node as including or as being associated with a VoIP call agent for the telephone number based on demonstrated knowledge of a PSTN call. The system may determine a target trust relationship to the target node based on the trust relationship information, where the target trust relationship indicates a level of trust a validating node has in the target node being associated with or including the VoIP call agent for the telephone number, and where validating node and the one or more nodes may be in different respective administrative domains of a network.

20 Claims, 13 Drawing Sheets

U.S. PATENT DOCUMENTS

| | | | |
|---|---|---|---|
| 7,016,343 B1 | 3/2006 | Mermel et al. | 370/356 |
| 7,143,052 B2 | 11/2006 | LaSalle et al. | 705/7 |
| 7,188,138 B1 | 3/2007 | Schneider | 709/203 |
| 7,190,772 B2* | 3/2007 | Moisey et al. | 379/114.27 |
| 7,218,722 B1* | 5/2007 | Turner et al. | 379/221.02 |
| 7,266,114 B2 | 9/2007 | Furukawa et al. | 370/352 |
| 7,289,493 B1 | 10/2007 | Vera | 370/356 |
| 7,352,856 B2* | 4/2008 | Matsuhashi et al. | 379/387.02 |
| 7,383,572 B2* | 6/2008 | Rolfe | 726/5 |
| 7,394,803 B1* | 7/2008 | Petit-Huguenin et al. | 370/352 |
| 7,457,283 B2* | 11/2008 | Dalton et al. | 370/352 |
| 7,602,734 B2 | 10/2009 | Tang et al. | 370/254 |
| 7,729,700 B2* | 6/2010 | Alemany et al. | 455/436 |
| 7,822,188 B1 | 10/2010 | Kirchhoff et al. | 379/211.02 |
| 7,852,831 B2* | 12/2010 | Akbar | 370/352 |
| 7,855,982 B2* | 12/2010 | Ramankutty et al. | 370/259 |
| 7,983,243 B2* | 7/2011 | Casey et al. | 370/352 |
| 8,040,875 B2* | 10/2011 | Barclay et al. | 370/352 |
| 2001/0032310 A1 | 10/2001 | Corella | 473/524 |
| 2002/0004900 A1 | 1/2002 | Patel | 713/155 |
| 2003/0053605 A1* | 3/2003 | Cashiola | 379/88.17 |
| 2003/0055898 A1* | 3/2003 | Yeager et al. | 709/205 |
| 2004/0067761 A1 | 4/2004 | Pyhalammi et al. | 455/466 |
| 2005/0232428 A1* | 10/2005 | Little et al. | 380/277 |
| 2006/0182029 A1* | 8/2006 | Kealy et al. | 370/230 |
| 2006/0216131 A1 | 9/2006 | Jhuang | 411/181 |
| 2006/0294576 A1* | 12/2006 | Cross et al. | 726/1 |
| 2007/0183440 A1 | 8/2007 | Bennet et al. | 370/419 |
| 2007/0201660 A1 | 8/2007 | Lan et al. | 379/201.01 |
| 2007/0248098 A1 | 10/2007 | Chen | 370/395.2 |
| 2008/0052270 A1 | 2/2008 | Karlsson | 707/3 |
| 2008/0292077 A1 | 11/2008 | Vinokurov et al. | 379/142.04 |
| 2009/0022149 A1 | 1/2009 | Rosenberg et al. | 370/389 |
| 2009/0022150 A1 | 1/2009 | Rosenberg et al. | 370/389 |
| 2009/0022155 A1 | 1/2009 | Rosenberg et al. | 370/392 |
| 2009/0025075 A1 | 1/2009 | Chow et al. | 726/10 |
| 2009/0100262 A1 | 4/2009 | Yoo | 713/155 |
| 2009/0323677 A1 | 12/2009 | Mehmood et al. | 370/352 |
| 2010/0002686 A1 | 1/2010 | Rosenberg et al. | 370/352 |
| 2010/0002687 A1 | 1/2010 | Rosenberg et al. | 370/352 |
| 2010/0046507 A1 | 2/2010 | Rosenberg et al. | 370/352 |
| 2010/0157853 A1 | 6/2010 | Li et al. | 370/271 |

FOREIGN PATENT DOCUMENTS

| | | |
|---|---|---|
| EP | 1 385 323 A1 | 1/2004 |
| EP | 1 555 786 A1 | 7/2005 |
| EP | 1 855 104 A1 | 2/2008 |
| JP | 2004-040541 | 2/2004 |
| JP | 2004-304281 | 10/2004 |
| WO | WO 2009/014974 A1 | 1/2009 |

OTHER PUBLICATIONS

Seedorf, Jan; Using Cryptographically Generated SIP-URIs to protect the integrity of content in P2P-SIP; Third Annual VoIP Security Workshop; Jun. 2, 2006.*

Niccolini, Saverio; SPIT Prevention: state of the art and research challenges; Third Annual VoIP Security Workshop; Jun. 2, 2006.*

Materna, Bogden; Threat Mitigation for VoIP; Third Annual VoIP Security Workshop; Jun. 2, 2006.*

Hansen et al.; Developing a Legally Compliant Reachability management system as a Countermeasure against SPIT; Third Annual VoIP Security Workshop; Jun. 2, 2006.*

Jennings et al.; Verification Involving PSTN Reachability: Requirements and Architecture Overview; Apr. 1, 2011; Internet Engineering Task Force; Version 00; pp. 1-41.*

Marias et al.; SIP Vulnerabilities and Anti-SPIT Mechanisms Assessment; Aug. 16, 2007; IEEE Computer Communications and Networks, 2007. Proceedings of 16th International Conference on Computer Communications and Networks (ICCCN), 2007; pp. 597-604.*

U.S. Appl. No. 12/370,384, filed Feb. 12, 2009, Rosenberg et al.
U.S. Appl. No. 12/367,930, filed Feb. 2, 2009, Rosenberg.
U.S. Appl. No. 12/495,615, filed Jun. 30, 2009, Mehmood et al.
U.S. Appl. No. 12/495,639, filed Jun. 30, 2009, Rosenberg et al.
U.S. Appl. No. 12/495,595, filed Jun. 30, 2009, Rosenberg et al.
U.S. Appl. No. 12/608,484, filed Oct. 29, 2009, Rosenberg et al.

Falstrom, P., "E 164 number and DNS", Request for Comments No. 2916, Network Working Group, Sep. 2000, p. 1-9, Cisco Systems, Inc.

Wu, T., The SRP Authentication and Key Exchange System, dated Sep. 2000, pp. 1-11, The Internet Society.

Rosenberg, J., Jennings, C., The Session Initiation Protocol (SIP) and Spam, dated Jan. 2008, pp. 1-37, The IETF Trust.

International Search Report dated Dec. 12, 2008, pp. 1-5, International Application No. PCT/US2008/070259, European Patent Office, The Netherlands.

Written Opinion dated Dec. 12, 2008, pp. 1-6, Application No. PCT/US2008/070259, European Patent Office, Germany.

Call detail record, dated May 5, 2009, pp. 1-2, Wikipedia, http://en.wikipedia.org/wiki/Call_detail_record.

Computer telephony integration, dated May 12, 2009, pp. 1-4, Wikipedia, http://en.wikipedia.org/wiki/Computer_telephony_integration.

Provisioning Protocol-Specific Interfaces, dated 2007, pp. 1-2, available at www.cisco.com, Cisco.

Neuman, C., Hartman, S., Raeburn, K., RFC 4120, dated Jul. 2005, pp. 1-139, The Internet Society.

Understanding DNSBL Filtering, Spamhaus, dated Oct. 25, 2007, pp. 1-3, www.spamhaus.org.

Bryan, D., Matthews, P., Shim, E., Willis, D., Concepts and Terminology for Peer to Peer SIP, dated Jun. 2007, pp. 1-26, IETF.

Freedman, M., Morris, R., Tarzan: A Peer-to-Peer Anonymizing Network Layer, dated 2002, pp. 1-14, ACM, Washington, D.C.

Tor: Overview, dated Mar. 2, 2009, pp. 1-5, The Tor Project, Inc., available at www.torproject.org.

Wang, X., Chen, S., Jajodia, S., Tracking Anonymous Peer-to-Peer VoIP Calls on the Internet, dated 2005, pp. 1-11, ACM, Alexandria, Virginia.

Ramasubramanian, V., Sirer, E., Perils of Transitive Trust in the Domain Name System, dated May 13, 2005, pp. 1-6, Cornell University, available at http://ecommons.library.cornell.edu.

Walsh, K., Sirer, E., Experience with an Object Reputation System for Peer-to-Peer Filesharing, dated 2006, pp. 1-14, USENIX Association.

Office Action, dated May 20, 2010, pp. 1-14, U.S. Appl. No. 11/780,975, U.S. Patent and Trademark Office, Virginia.

International Search Report dated Apr. 5, 2010, pp. 1-3, International Application No. PCT/US2010/022004, European Patent Office, The Netherlands.

Written Opinion dated Apr. 5, 2010, pp. 1-7, Application No. PCT/US2010/022004, European Patent Office, Germany.

Notice of Allowance, dated Sep. 14, 2010, pp. 1-6, U.S. Appl. No. 11/780,975, U.S. Patent and Trademark Office, Virginia.

Office Action dated Oct. 6, 2010, pp. 1-11, U.S. Appl. No. 12/370,384, U.S. Patent and Trademark Office, Virginia.

Office Action, dated Jan. 7, 2011, pp. 1-43, U.S. Appl. No. 12/367,930, U.S. Patent and Trademark Office, Virginia.

Office Action, dated Jan. 12, 2011, pp. 1-44, U.S. Appl. No. 12/495,615, U.S. Patent and Trademark Office, Virginia.

Office Action, dated Jan. 7, 2011, pp. 1-43, U.S. Appl. No. 12/495,595, U.S. Patent and Trademark Office, Virginia.

Office Action, dated Jan. 6, 2011, pp. 1-49, U.S. Appl. No. 11/780,928, U.S. Patent and Trademark Office, Virginia.

Office Action, dated Jan. 6, 2011, pp. 1-43, U.S. Appl. No. 11/780,941, U.S. Patent and Trademark Office, Virgina.

Office Action, dated Jan. 13, 2011, pp. 1-53, U.S. Appl. No. 12/495,639, U.S. Patent and Trademark Office, Virginia.

Seedorf, Jan, SIP Security: Status Quo and Future Issues, Dec. 27, 2006, pp. 1-5, 23$^{rd}$ Chaos Communication Congress.

Seedorf, Jan, Using Cryptographically Generated SIP-URIs to Protect the Integrity of Content in P2P-SIP, Jun. 2, 2006, pp. 1-16, Third Annual VoIP Security Workshop, Berlin, Germany.

Niccolini, Saverio, SPIT Prevention: State of the Art and Research Challenges, Jun. 2, 2006, pp. 1-37, Network Laboratories, NEC Europe Ltd., Heidelberg, Germany.

Materna, Bogdan, Threat Mitigation for VoIP, Jun. 2, 2006, pp. 1-12, Third Annual VoIP Security Workshop, VoIPshield Systems, Inc.

Hansen et al., Developing a Legally Compliant Reachability Management System as a Countermeasure Against SPIT, Jun. 2, 2006, pp. 1-19, Third Annual VoIP Security Workshop.

Office Action, dated Jan. 20, 2011, pp. 1-56, U.S. Appl. No. 12/608,484, U.S. Patent and Trademark Office, Virginia.

Office Action, dated Mar. 8, 2011, pp. 1-34, U.S. Appl. No. 12/370,384, U.S. Patent and Trademark Office, Virginia.

International Search Report, dated Nov. 4, 2010, pp. 1-3, International Application No. PCT/US2010/037459, European Patent Office, The Netherlands.

Written Opinion, dated Nov. 4, 2010, pp. 1-8, International Application No. PCT/US2010/037459, European Patent Office, The Netherlands.

Rosenberg, J. et al., RFC 5039—The Session Initiation Protocol (SIP) and Spam, dated Jan. 2008, pp. 1-27, www.rfc-editor.org/rfc/rfc5039.txt.

Rosenberg, J. et al., The Session Initiation Protocol (SIP) and Spam—draft-rosenberg-sipping-spam-00, dated Jul. 11, 2004, pp. 1-21, IETF, http://tools.ietf.org/html/draft-rosenberg-sipping-spam-00.

Cao, Feng et al., Providing Response Identity and Authentication in IP Telphony, dated 2006, pp. 1-8, IEEE Computer Society.

International Preliminary Report on Patentability, dated Jan. 26, 2010, pp. 1-7, International Application No. PCT/US2008/070259, International Bureau of WIPO, Switzerland.

Lack of Unity Action and Partial International Search, dated Mar. 3, 2011, pp. 1-6. International Application No. PCT/US2010/051820, European Patent Office, The Netherlands.

d'Heureuse, Nico et al., Protecting SIP-based Networks and Services from Unwanted Communications, dated 2008, pp. 1-5, IEEE.

Chiang, Hsia-Ling et al., A Study of Global Numbering Plan With Active Anti-Spit Capability on Voip, dated 2008, pp. 17-22, IEEE.

Office Action, dated Nov. 1, 2011, pp. 1-41, U.S. Appl. No. 11/780,928, U.S. Patent and Trademark Office, Virginia.

Office Action, dated Nov. 3, 2011, pp. 1-41, U.S. Appl. No. 11/780,941, U.S. Patent and Trademark Office, Virginia.

European Office Action, dated Nov. 14, 2011, pp. 1-4, European Patent Application No. 08781931.4, European Patent Office, Germany.

Notice of Allowance, dated Jul. 28, 2011, pp. 1-9, U.S. Appl. No. 11/780,975, U.S. Patent and Trademark Office, Virginia.

Notice of Allowance, dated Oct. 5, 2011, pp. 1-8, U.S. Appl. No. 12/370,384, U.S. Patent and Trademark Office, Virginia.

International Search Report, dated Mar. 18, 2011, International Application No. PCT/US2010/051822, European Patent Office, The Netherlands.

Office Action, dated Jun. 22, 2011, pp. 1-40, U.S. Appl. No. 11/780,928, U.S. Patent and Trademark Office, Virginia.

Office Action, dated Jun. 22, 2011, pp. 1-31, U.S. Appl. No. 11/780,941, U.S. Patent and Trademark Office, Virginia.

Office Action, dated Jun. 27, 2011, pp. 1-38, U.S. Appl. No. 12/367,930, U.S. Patent and Trademark Office, Virginia.

Office Action, dated Jun. 27, 2011, pp. 1-36, U.S. Appl. No. 12/495,615, U.S. Patent and Trademark Office, Virginia.

Office Action, dated Jun. 27, 2011, pp. 1-40, U.S. Appl. No. 12/495,639, U.S. Patent and Trademark Office, Virginia.

Office Action, dated Jun. 27, 2011, pp. 1-41, U.S. Appl. No. 12/608,484, U.S. Patent and Trademark Office, Virginia.

Office Action, dated Jun. 27, 2011, pp. 1-35, U.S. Appl. No. 12/495,595, U.S. Patent and Trademark Office, Virginia.

International Search Report, dated Jun. 29, 2011, International Application No. PCT/US2010/051820, European Patent Office, The Netherlands.

Notice of Allowance, dated Aug. 18, 2011, pp. 1-10, U.S. Appl. No. 12/370,384, U.S. Patent and Trademark Office, Virginia.

International Preliminary Report on Patentability, dated Aug. 9, 2011, pp. 1-7, International Application No. PCT/US2010/022004, International Bureau of WIPO, Switzerland.

Notice of Allowance, dated Apr. 7, 2011, pp. 1-17, U.S. Appl. No. 11/780,975, U.S. Patent and Trademark Office, Virginia.

Notice of Allowance, dated Feb. 16, 2011, pp. 1-11, U.S. Appl. No. 11/780,928, U.S. Patent and Trademark Office, Virginia.

Notice of Allowance, dated Feb. 22, 2012, pp. 1-11, U.S. Appl. No. 11/780,941, U.S. Patent and Trademark Office, Virginia.

Office Action, dated Jan. 5, 2012, pp. 1-41, U.S. Appl. No. 12/367,930, U.S. Patent and Trademark Office, Virginia.

Office Action, dated Jan. 23, 2012, pp. 1-41, U.S. Appl. No. 12/608,484, U.S. Patent and Trademark Office, Virginia.

Office Action, dated Jan. 23, 2012, pp. 1-39, U.S. Appl. No. 12/495,639, U.S. Patent and Trademark Office, Virginia.

Office Action, dated Jan. 25, 2012, pp. 1-48, U.S. Appl. No. 12/495,595, U.S. Patent and Trademark Office, Virginia.

Office Action, dated Jan. 26, 2012. pp. 1-51, U.S. Appl. No. 12/495,615, U.S. Patent and Trademark Office, Virginia.

International Preliminary Report on Patentability and Written Opinion, dated Jan. 12, 2012, pp. 1-8, International Application No. PCT/US2010/037459, International Bureau of WIPO, Switzerland.

* cited by examiner

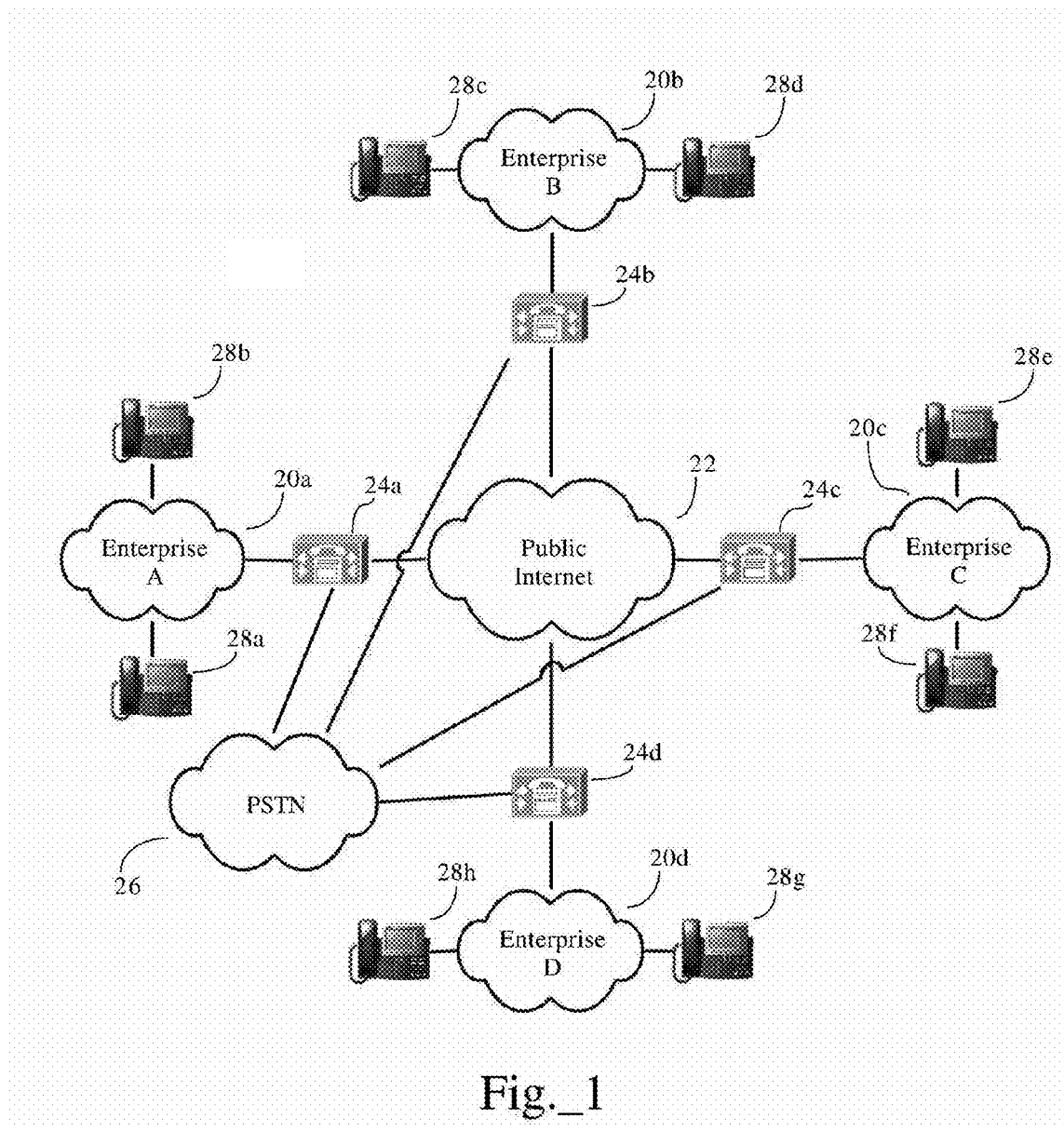
Fig._1

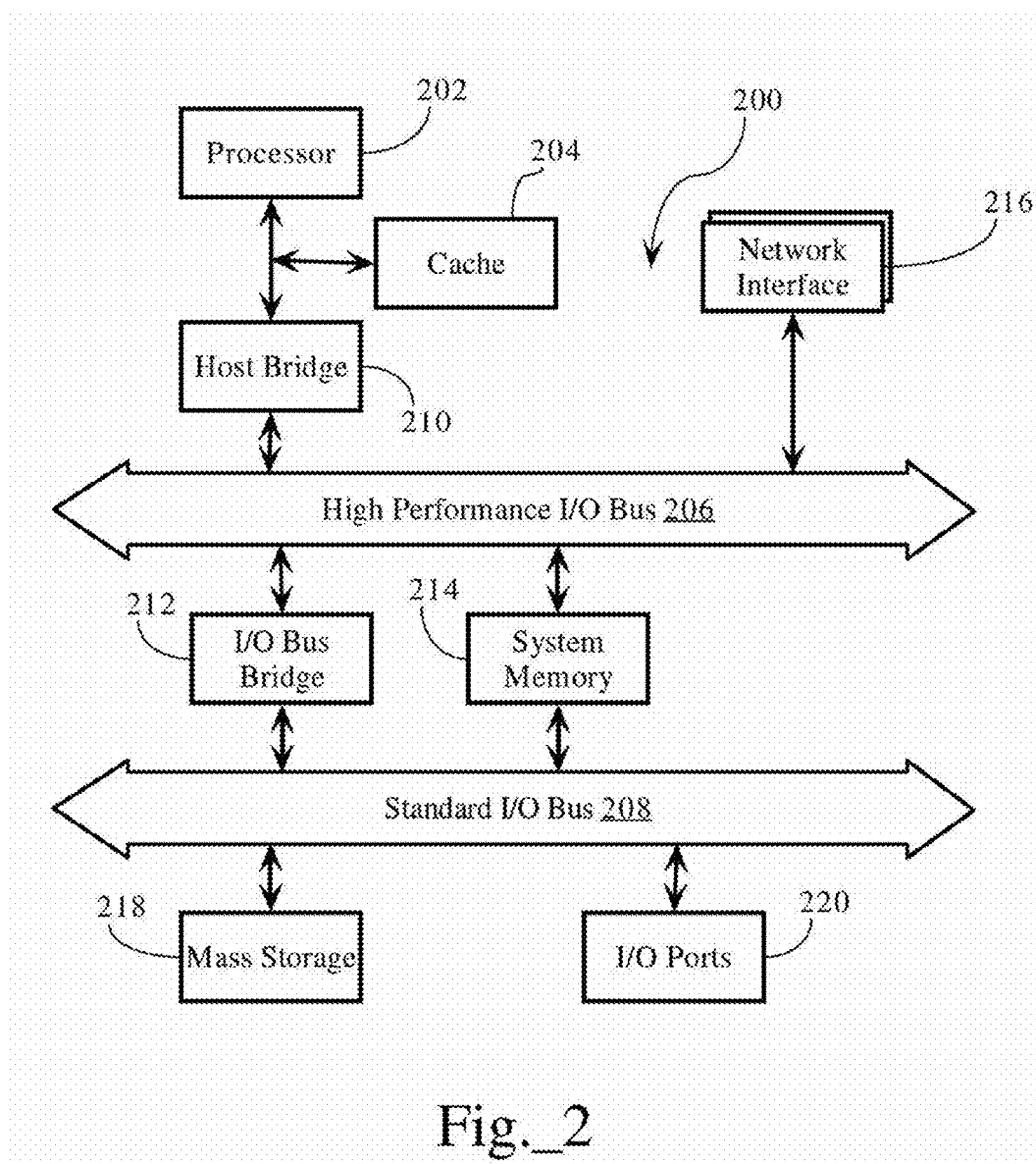
Fig._2

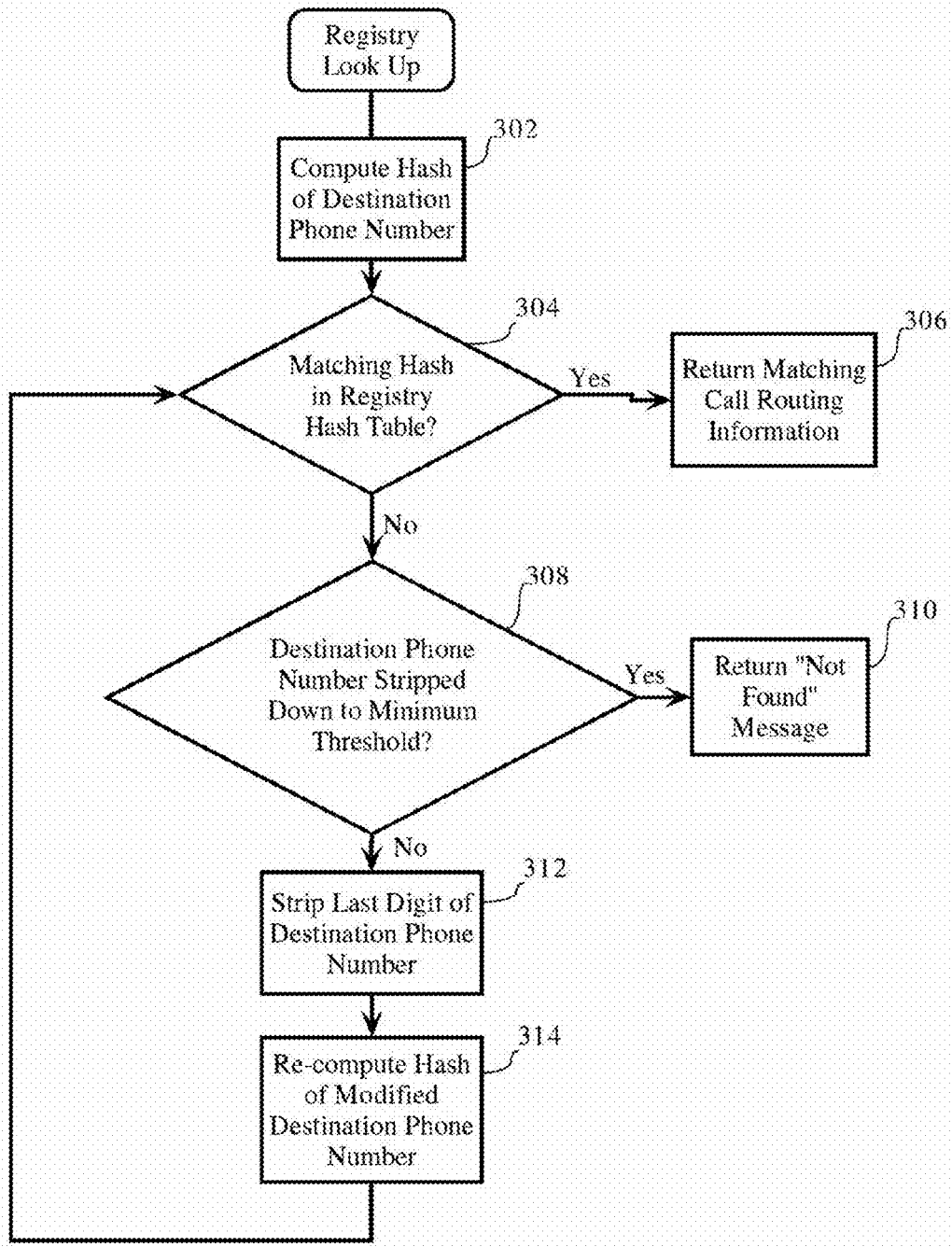
Fig._3

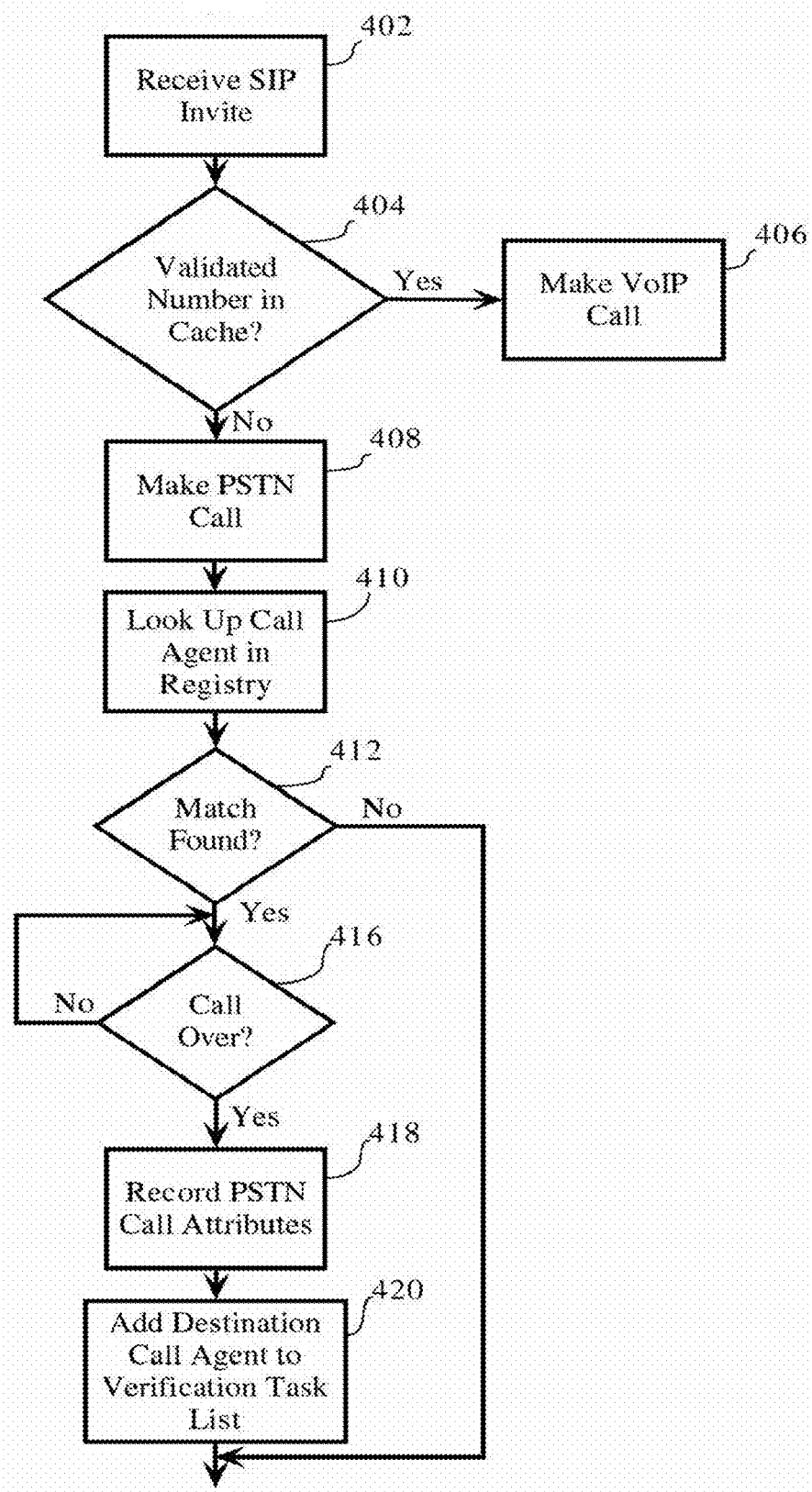
Fig._4

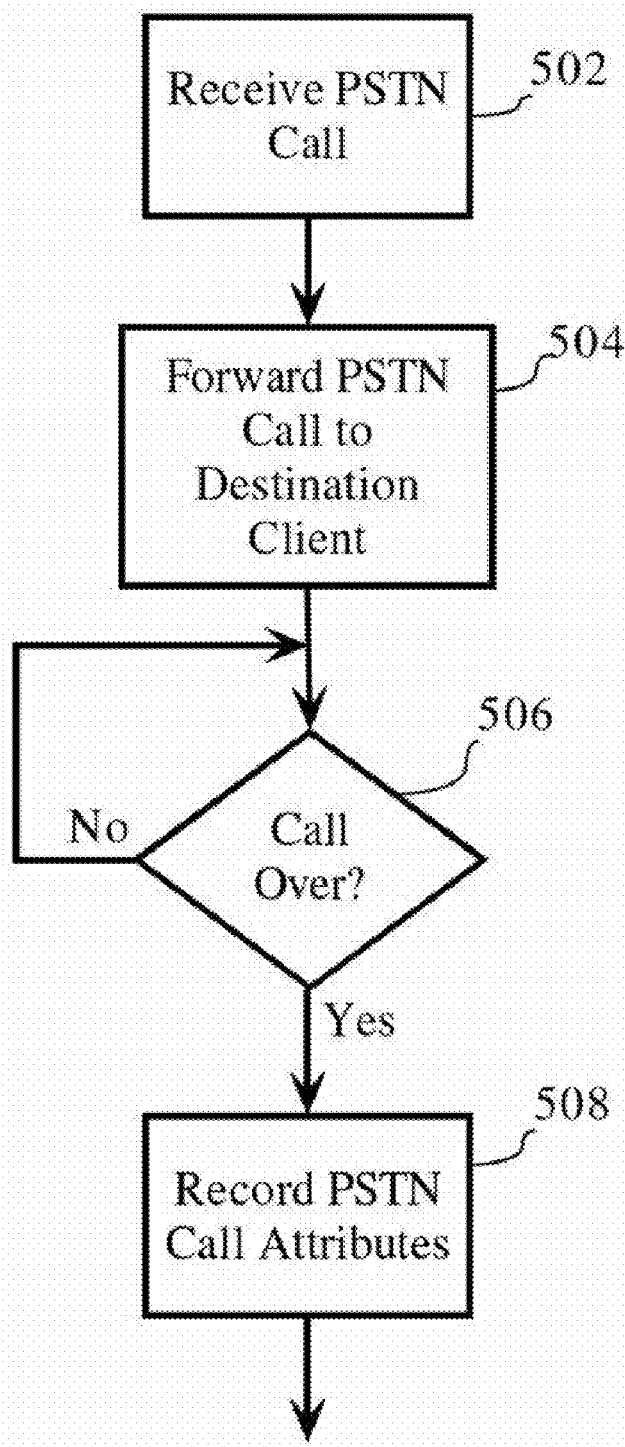
Fig._5

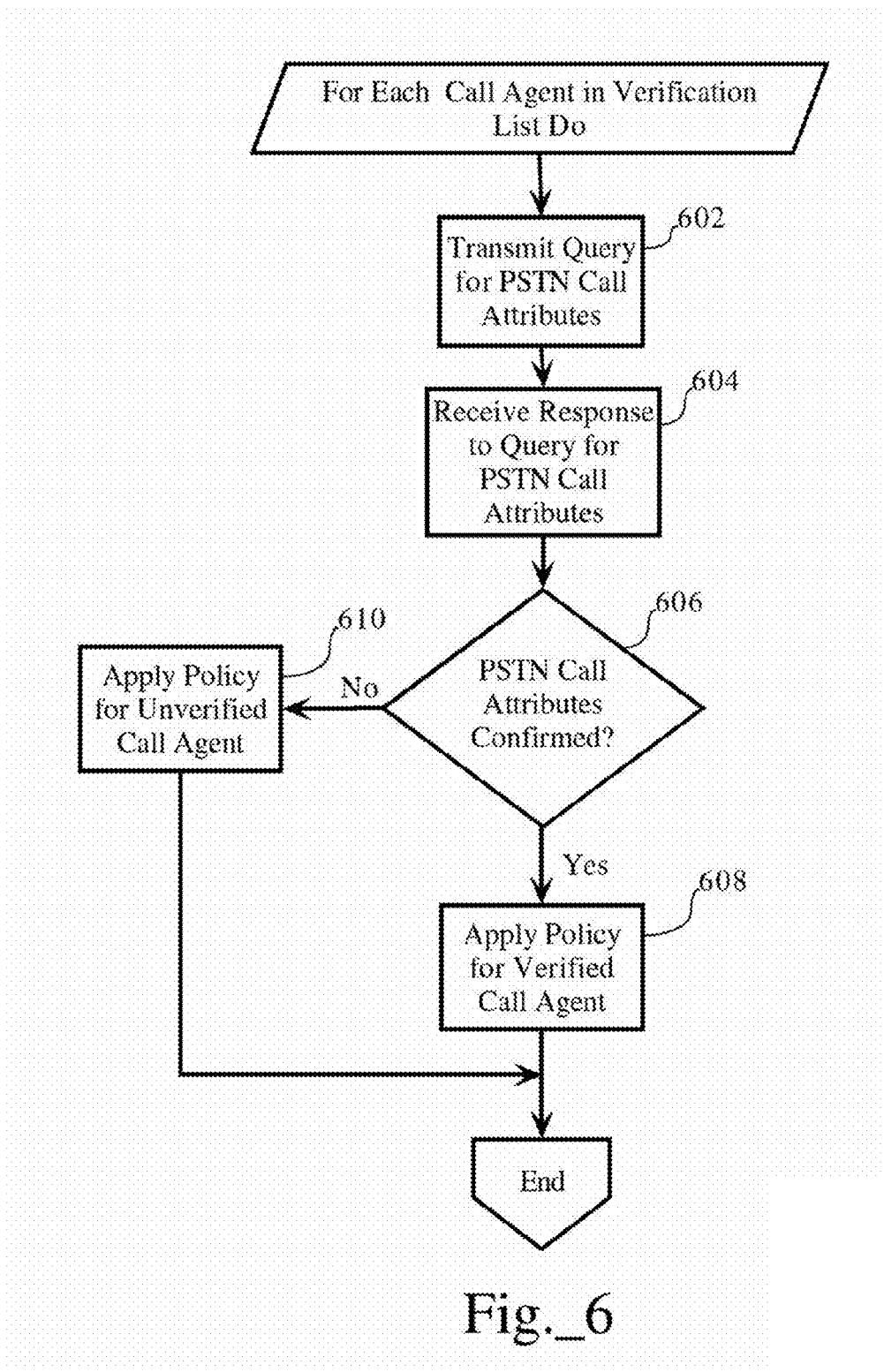
Fig._6

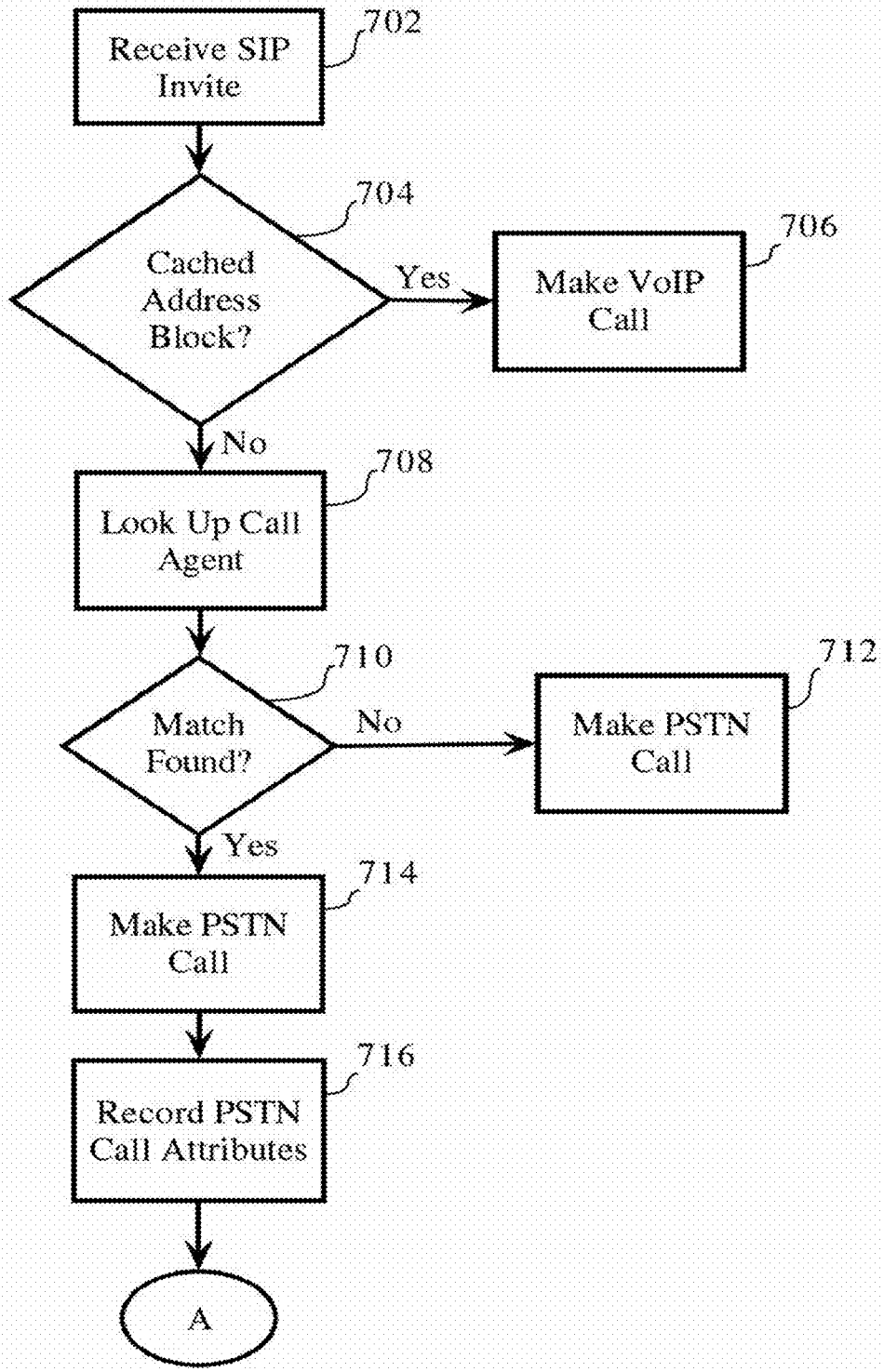
Fig._7A

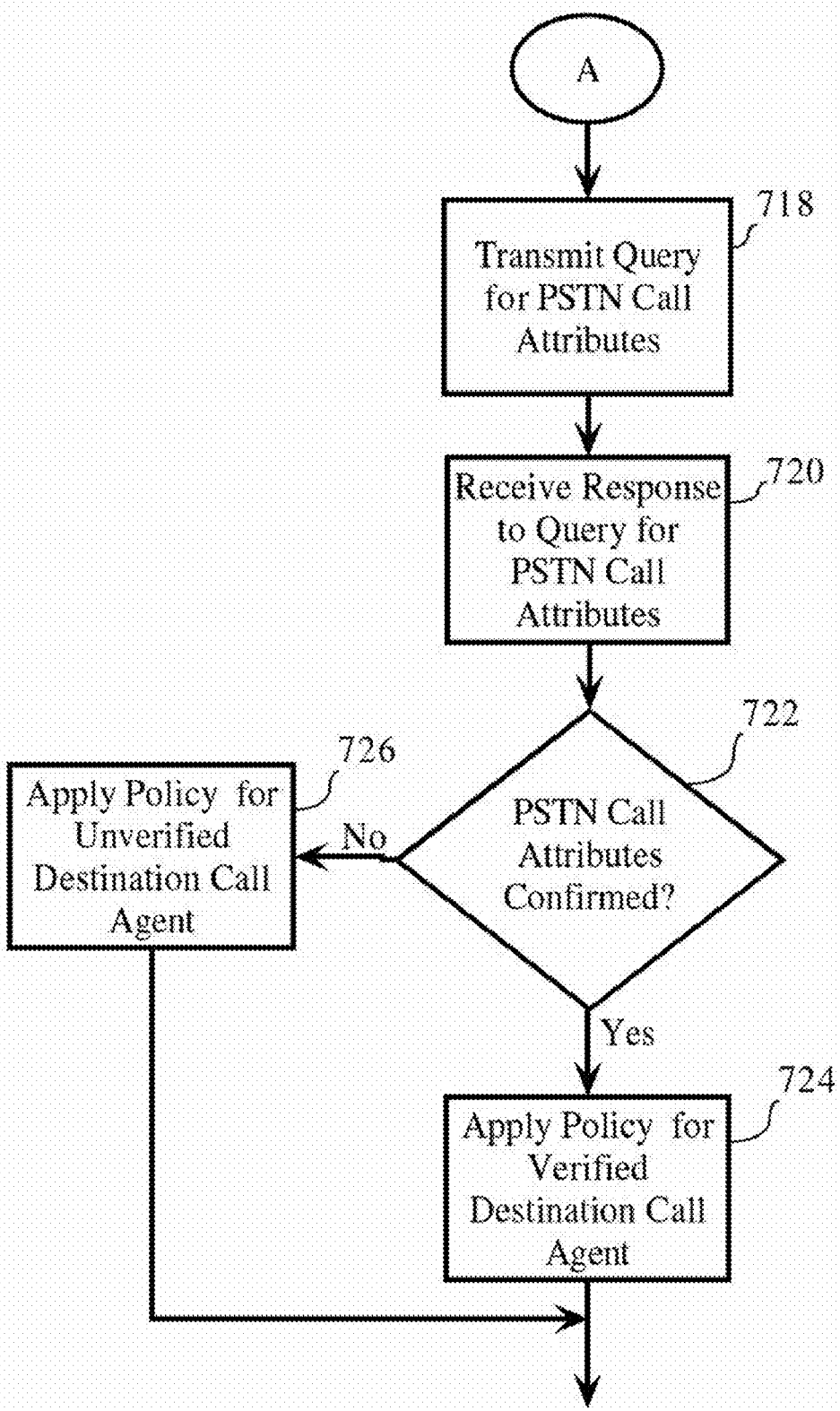
Fig._7B

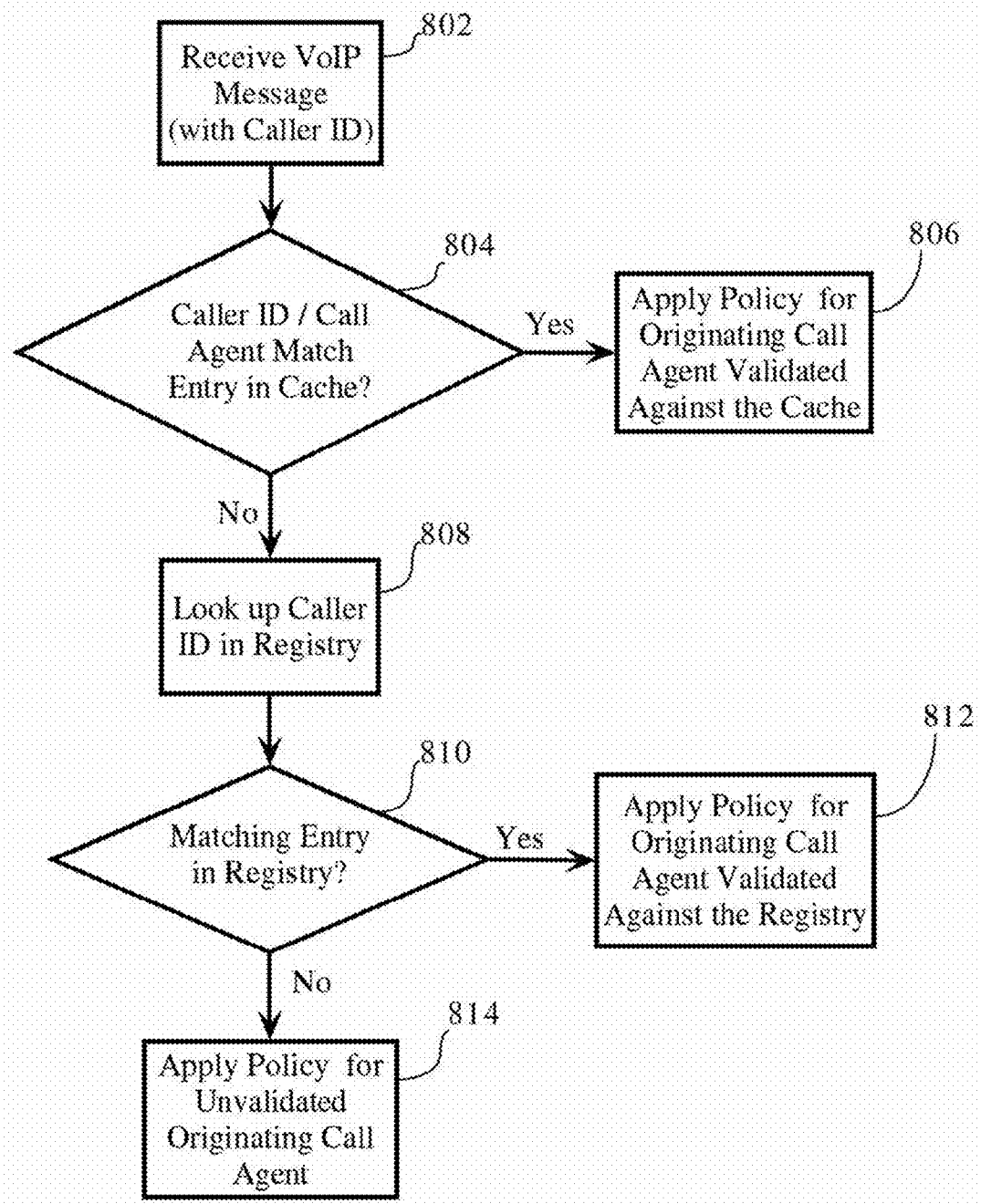
Fig._8

US 8,223,755 B2

NODE REPUTATION BASED ON KNOWLEDGE OF PSTN CALLS

This application claims priority under 35 U.S.C. §120 to, and is a continuation-in-part of, U.S. patent application Ser. No. 11/780,928, "USING PSTN REACHABILITY TO VERIFY VOIP CALL ROUTING INFORMATION" filed Jul. 20, 2007, the entire contents of which are hereby incorporated herein by reference.

TECHNICAL FIELD

This disclosure relates generally to Voice over Internet Protocol (VoIP), and specifically to VoIP address discovery.

BACKGROUND

Voice over Internet protocol (VoIP) systems manage the delivery of voice information over the Internet. VoIP involves sending voice information in digital form in discrete packets rather than using the traditional circuit-committed protocols of the public switched telephone network (PSTN). VoIP is also referred to as IP Telephony, Internet telephony, Broadband telephony, Broadband Phone, and Voice over Broadband. A major advantage of using VoIP is that VoIP avoids the tolls charged by ordinary telephone service providers. As such, VoIP systems are becoming ever more common within enterprises.

A VoIP call may involve a signaling session and a media session. The signaling may be accomplished using various protocols such as Session Initiation Protocol (SIP), H.323 Protocol, or any other suitable signaling protocols. SIP is an application-layer control (signaling) protocol that is used for creating, modifying, and terminating media sessions with one or more participants. These media sessions may include Internet telephone calls, multimedia distribution, and multimedia conferences.

Typically, a call agent handles VoIP call routing for VoIP clients. The call agent typically makes a VoIP call using a destination telephone number. This number may be associated with a client on the same call agent, in which case the call is sent directly to that client. Alternatively or in addition, the number may be associated with a client that is associated with a different agent within the same enterprise. In that case, the call agent may send the call to that agent, using configured rules that define how to route the call. When users within the enterprise communicate with users outside of the enterprise, the call may be terminated on a PSTN gateway and routed off to the PSTN. This, however, eliminates many of the benefits of VoIP.

Across enterprises or groups of enterprises, two call agents may connect to each other directly over IP, without requiring the PSTN. One or both of the two call agents may be configured with an address of the other call agent in order to initiate a signaling session between the call agents. However, obtaining the address of the call agents may be burdensome.

BRIEF DESCRIPTION OF THE DRAWINGS

The components and the figures are not necessarily to scale, emphasis instead being placed upon illustrating the examples. Moreover, in the figures, like-referenced numerals designate corresponding parts throughout the different views.

FIG. 1 illustrates example components in a Voice over Internet Protocol (VoIP) network and a Public Switched Telephone Network (PSTN) system;

FIG. 2 illustrates for didactic purposes a hardware system, which may be used to implement an Internet Protocol Private Branch Exchange (IP-PBX) or other host of call agent or call manager functionality;

FIG. 3 illustrates an example process flow implemented at an originating call agent and associated with looking up an address block in a registry of VoIP call routing information;

FIG. 4 illustrates an example process flow implemented at an originating call agent to determine whether to make a PSTN or VoIP call in response to a call initiation message;

FIG. 5 illustrates an example process flow implemented at a destination call agent responsive to receiving a PSTN call;

FIG. 6 illustrates an example process flow implemented at an originating call agent and associated with verifying a destination call agent;

FIGS. 7A and 7B illustrate an example process flow implemented at an originating call agent and associated with verifying a destination call agent during a PSTN call;

FIG. 8 is a flow chart of operation of one embodiment implemented at a destination call agent and associated with verifying the caller ID in a call initiation message;

DESCRIPTION OF EXAMPLE EMBODIMENTS

Overview

Figure 9:
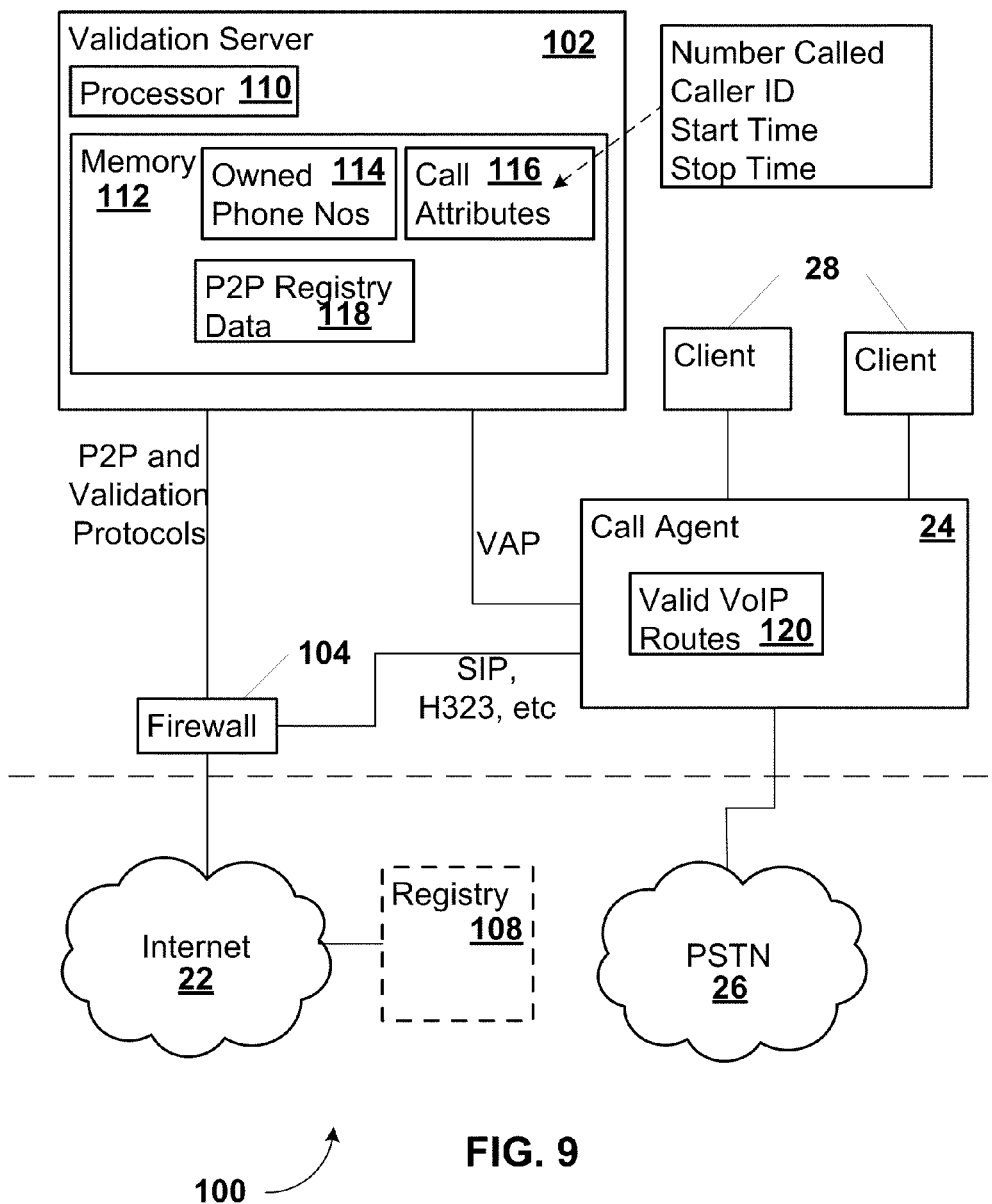
FIG. 9 illustrates an example of a system that separates validation services from the services of a call agent.

By way of introduction, the example embodiments described below include a system to determine a target trust relationship to a target node based on trust relationship information, logic encoded in a computer readable media to determine a target trust relationship to a target node, and a method to validate an identity of a target node for a telephone number based on a target trust relationship.

According to a first aspect, the system may provide trust relationship information for a telephone number, where the trust relationship information indicates whether at least one node considers a target node as including or as being associated with a VoIP call agent for the telephone number. The at least one node may consider the target node as such based on demonstrated knowledge of at least one PSTN call. The system determine a target trust relationship to the target node based on the trust relationship information. The target trust relationship may indicate a level of trust a validating node has in the target node being associated with or including the VoIP call agent for the telephone number, where the validating node and the at least one node are in different respective administrative domains of a network.

In a second aspect, logic encoded in computer readable media may generate trust relationship information for a telephone number, where the trust relationship information includes an indication that at least one node considers a target node as including or as being associated with a VoIP call agent for the telephone number. The at least one node may consider the target node as such based on demonstrated knowledge of at least one PSTN call. The logic may determine a target trust relationship to the target node from the trust relationship information. The target trust relationship may indicate a degree to which a validating node trusts the target node as being associated with or including the VoIP call agent for the telephone number, where the validating node and the at least one node are in separate administrative domains.

In a third aspect, a method is provided. At least a portion of trust relationship information for a telephone number may be provided, where the trust relationship information indicates that at least one node considers a target node as including or as being associated with a VoIP call agent for the telephone number based on knowledge of at least one PSTN call. An identity of the target node for the telephone number may be validated based on a target trust relationship, which is determined from the trust relationship information. The target trust relationship may indicate a level of trust that a validating node has in the target node being associated with or including the VoIP call agent for the telephone number, where the validating node and the at least one node are in a first administrative domain and a second administrative domain, respectively.

Example Embodiments

The exchange and security of VoIP calls between call agents over public packet-based communications networks are facilitated in a PSTN system. A call agent may use the PSTN system to verify ownership of a telephone number by another call agent. The PSTN system may facilitate forming reputations of call agents. A call agent may use a reputation of another call agent to verify that the other call agent owns the telephone number.

As described in further detail below, in one implementation, a call agent claiming ownership to one or more telephone numbers may modify a registry of VoIP call routing information with address blocks containing telephone numbers and/or prefixes in association with a network address of a call agent. This registry may be accessible to multiple call agents across a network. The registry may be a maintained in a central repository or in a distributed system, such as a peer-to-peer (P2P) network, where each call agent is a peer operative to exchange VoIP call routing information with other peers.

The registry may include a hash-based access mechanism to protect unfettered access to the VoIP call routing information. The hash-based access mechanism may be based on a cryptographic hash function. The cryptographic hash function may be a deterministic procedure that takes an arbitrary block of data and returns a fixed-size bit string, the (cryptographic) hash value, such that an accidental or intentional change to the data will change the hash value. One property of the cryptographic hash function is that calculating the arbitrary block of data from the hash value is computationally expensive or infeasible. The hash-based access mechanism to protect unfettered access to the VoIP call routing information may leverage this property of the cryptographic hash function.

For example, instead of each entry of the registry including a telephone number or prefix (or block of telephone numbers) stored unencrypted, the entry may include a hashed value of each telephone number or prefix. To create an entry in the registry, a call agent may hash each of its claimed telephone numbers and prefixes and place each into the registry. Similarly, an originating (calling) call agent, responsive to a call initiation message identifying a destination telephone number, may determine the IP address of a destination call agent by hashing the destination telephone number and looking the destination telephone number up in the registry. In one implementation, the originating call agent searches the registry for a matching entry, where a matching entry would contain an IP address corresponding to the destination call agent. As described in more detail below, the originating call agent may have the destination telephone number, while the hash in the registry may be of a prefix that covers the destination telephone number. Accordingly, in one implementation, if there is not a matching entry for the hashed destination telephone number, the originating call agent may strip the last digit of the number, hash the stripped number, and perform another search. The originating call agent may repeat this process until a match is found or until the number of remaining digits is reached to a predefined threshold number.

However, the usage of the registry alone may not be sufficient for secure operation of the system. The principle challenge to solve is to be confident that the entries in the registry are correct. In particular, it should be verified that the call agent that has written an entry or series of entries into the registry is truly the "owner" of those numbers. Here, "ownership" implies the property that, had the call actually been routed over the PSTN, the call would arrive at that same agent or an agent within the same enterprise. As described in further detail below, in one implementation, an originating call agent may validate ownership of a telephone number by making a PSTN call to the destination call agent claiming to own the telephone number. Both call agents record attributes of the PSTN call. PSTN call attributes may include, for example, a start time, an end time if applicable, a call length, caller ID, and other attributes of the call. Either during or after the call, the originating call agent transmits a request, over IP, for PSTN call attributes to the destination call agent. If the destination call agent had not received the PSTN call, the destination call agent will not have access to these attributes. Therefore, if the destination call agent can provide these attributes to the originating call agent, the destination call agent can demonstrate ownership of the destination number. Depending on whether the destination call agent responds successfully, the originating call agent may apply an appropriate policy (e.g., store data associated with the verified call agent in the cache so that, for example, future calls can be connected immediately over VoIP, continue the PSTN call, etc.).

As described in further detail below, in one implementation, a destination call agent may verify the caller identification (ID) provided in a VoIP call signaling message sent by an originating call agent by validating the originating call agent against the cache or against the registry. In one implementation, the destination call agent may also verify the caller ID provided by the originating call agent by making a PSTN call to the number provided in the caller ID, where both call agents record the PSTN call attributes. Either during or after the call, the destination call agent may transmit, over IP, a request for PSTN call attributes to the originating call agent. Depending on whether the originating call agent successfully responds to the request, the originating call agent may apply an appropriate policy. For example, the originating call agent may display the caller ID or permit the call to proceed for a verified call agent.

As also described in further detail below, in one implementation, the validation of VoIP routes may be separated from the call agent. A validation server—instead of or in addition to the call agent—may validate ownership of a telephone number or otherwise communicate with the registry. The validation server and the call agent may communicate using a validation access protocol (VAP). Using VAP, the call agent may transmit the PSTN call attributes to the validation server. After validating VoIP routes, the validation server may transmit the validated VoIP routes using VAP to the call agent for storage in a cache. When determining whether to initiate a call to a destination telephone number over a VoIP network or over the PSTN, the call agent may search the cache for a corresponding validated route that matches the destination telephone number. If the call agent finds a corresponding validated route, then the call agent may initiate the call over the VoIP network. If the call agent fails to find the corresponding validated route, the call agent may initiate a call over the PSTN.

As also described in further detail below, ownership of a telephone number by a node may be verified based on a reputation of the node, the node including the call agent and/or validation server. The reputation of the node may be based on whether one or more other nodes have validated the node for the telephone number based on demonstrated knowledge of at least one PSTN call. The reputation of the node may be further based on at least one trust relationship or chain of trust relationships between a validating node and the one or more other nodes that validated the node owns the telephone number. For example, the call agent in domain b.com may have a need to validate the call agent in domain c.com. If the call agent in domain b.com trusts the call agent in domain a.com and the call agent in domain a.com has already validated the call agent in domain c.com, the call agent in domain b.com may treat the call agent in domain c.com as validated without the call agent in domain b.com making a PSTN call to the call agent in domain c.com.

PSTN Validation

FIG. 1 illustrates an example network environment including a packet-switched communications network, supporting a Voice over Internet Protocol (VoIP) network, and a Public Switched Telephone Network (PSTN) system. In one embodiment, the system includes enterprise networks 20a, 20b, 20c, and 20d that are operably coupled to a public Internet 22. The enterprise networks 20a, 20b, 20c, and 20d include respective call agents 24a, 24b, 24c, and 24d that are also operably coupled to a PSTN network 26. Each of enterprise networks 20a, 20b, 20c, and 20d are also operably coupled to one or more clients 28a-28h over the respective enterprise networks.

A call agent 24, may be any component configured to receive call control protocol messages. Alternatively or in addition, the call agent 24 may be any component configured to transmit call control protocol messages. A VoIP call agent, may be any call agent 24 configured to receive VoIP call control protocol messages. Alternatively or in addition, the VoIP call agent may be any call agent 24 configured to transmit VoIP call control protocol messages. Examples of a VoIP call control protocol include Session Initiation Protocol (SIP), H.323 Protocol, or any other suitable signaling protocols. In one implementation, a call agent 24 may be an IP-PBX hosting call manager application, such as Cisco Call Manager (CCM), or any node hosting VoIP call manager functions. In another implementation, the call agent 24 may be an IP to IP gateway, such as a Session Border Controller (SBC) or Back-to-Back User Agent (B2BUA) connected to an existing TDM PBX, IP PBX, or other voice or voice over IP equipment. In another implementation, call agent 24 may be a firewall or border router at the edge or near the edge of the IP network 20. In yet another implementation, the call agent 24 may be a softswitch. In one implementation, the call agents 24 may perform the processes described below, including functionalities directed to accessing registries of VoIP call routing information, making and receiving PSTN and VoIP calls and verifying other call agents. In particular implementations, call agents 24 may possibly have media gateway functionalities. In one implementation, a client 28 may be a phone operably connected to a network or directly to a call agent 24. Alternatively or in addition, the client 28 may be a VoIP client.

A call agent 24, when implemented on an IP-PBX, may switch calls between VoIP clients 28 on local lines while allowing all VoIP clients 28 to share a certain number of external PSTN network phone lines. The call agent 24 may also switch calls between a VoIP user and a traditional telephone user, or between two traditional telephone users in the same way that a conventional PBX does.

In particular implementations, the call agents 24 are operative to connect through the public Internet 22 to form a P2P network for the purpose of maintaining a distributed registry of VoIP call routing information. In another implementation, call agents 24 all access a centralized or hierarchically structured common store, such as a database Domain Name System (DNS) servers for the purpose of storing and accessing the registry of VoIP call routing information. In one implementation, each call agent 24 is operable to maintain and access a cache, where the cache may be a local cache that resides in the call agent 24 or may be external to but accessible by call agents 24 of the P2P network. As discussed below, the local cache contains validated VoIP call routing information. Each call agent 24 is also operable to access a registry of VoIP call routing information. A given call agent 24 may access its cache or the registry to store or to look up VoIP call routing information of other call agents to make VoIP calls, as well as to verify other call agents.

A PSTN 26 is a circuit-switched network, comprising all or a subset of the world's public circuit-switched telephone networks. The PSTN may include partial fixed-line analog telephone systems, and partial digital telephone systems, as well as mobile telephone systems. An advantage of utilizing the PSTN 26 is that the PSTN 26 may operatively connect many enterprises in the world that have PSTN connectivity and possibly caller ID and connected party ID.

FIG. 2 illustrates for didactic purposes a hardware system 200, which may be used to implement a call agent host, such as an Internet Protocol Private Branch Exchange (IP-PBX). In one implementation, hardware system 200 comprises a processor 202, a cache memory 204, and one or more software applications and drivers directed the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and one or more network/communication interfaces 216 couple to bus 206. Hardware system 200 may further include video memory (not shown) and a display device coupled to the video memory. Mass storage 218 and I/O ports 220 couple to bus 208. Hardware system 200 may optionally include a keyboard and pointing device (not shown) coupled to bus 208. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the system controller, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures, and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain implementations may not require nor include all of the above components. For example, the peripheral devices shown coupled to standard I/O bus 208 may couple to high performance I/O bus 206. In addition, in some implementations a single bus may exist with the components of hardware system 200 being coupled to the single bus. Furthermore, hardware system 200 may include additional components, such as additional processors, storage devices, or memories.

As discussed above, in one embodiment, the operations of the gateway or call manager described herein are implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment, the operating system is the Windows® 95/98/NT/XP operating system, available from Microsoft Corporation of Redmond, Wash. However, other embodiments may be used with other suitable operating systems, such as the Apple Macintosh Operating System, available from Apple Computer Inc. of Cupertino, Calif., UNIX operating systems, LINUX operating systems, and the like.

In one embodiment, VoIP call routing information is maintained in a registry accessible to one or more call agents 24. In one implementation, the registry may be discoverable and publicly accessible. In one embodiment, the VoIP call routing information may include a set of entries, each including a telephone number or a prefix that represents a range of telephone numbers (or a set of telephone numbers or prefixes). For example, a given enterprise may own the telephone number +1-408-876-5432 and an address block of telephone numbers +1-973-952-5000 through +1-973-952-5999. As such, the call agent 24 of the enterprise may create two entries and would register, for each, a mapping that associates its identity with the number or prefix. In one implementation, the key for the mapping is the number or prefix of the number, including the digits only. In the example above, one key would be 14088765432, and the other would be 19739525. As such, in one implementation, each call agent may register blocks of telephone numbers that each call agent owns by treating the prefix as a number and entering the prefix in the registry. The identity information may include a network address (e.g., IP address, port number, hostname, etc.) or any other type of information that identifies a call agent.

In one embodiment, participation in the P2P network may require the call agent to have a predefined minimum number (e.g., a few dozen) of TCP connections to other nodes in the network. Those connections may be established dynamically, with the peers learned through the P2P protocols. In one implementation, registration into the P2P network may involve running an algorithm to select a peer to which a write operation should take place. That peer, in turn, passes the write onto another peer, and so on. This results in the data being stored and distributed across the call agents participating in the P2P network.

As discussed above, the registry of VoIP call routing information may include a hash-based mechanism protecting against unfettered access to the registry. That is, the telephone numbers or prefixes in the registry entries are hashed values. To store an entry in the registry, a call agent may first hash its associated phone number or prefix before storing the hashed value in the registry in association with its identity. The call agent may hash the telephone number or prefix using any suitable hash algorithm, such as MD5 and SHA1. Generally, a strong hash function should be used to ensure that the hashed value is unique to a given telephone number or prefix. By hashing the prefix or phone number, a given call agent may advertise number blocks in a secure manner. For example, using hashed telephone numbers or prefixes prevents telemarketers, spammers and spitters (VoIP spammers) from simply collecting telephone numbers from the registry. A user would need to know the correct telephone number first before attempting a successful search of the registry for VoIP call routing information. Otherwise, it would be computationally expensive (because of the computing resources required to compute the hash) to attempt to learn a significant amount of the VoIP call routing information maintained in the registry by repeatedly selecting a telephone number or prefix, computing a hash value and looking the hash value up against the registry.

Topologically, the registry of VoIP call routing information may be maintained in a variety of ways. In one implementation, the registry may be maintained using a P2P network. The P2P network may be made up of all or some of the call agents in the system, or the registry can be maintained in a different P2P network, accessed by all of the call agents in the system. When a P2P network is utilized, each node in the P2P network (which may be the call agents), will end up maintaining a subset of the information in the registry, depending on the P2P protocols that are in use. Any suitable P2P protocol or technique may be used, including Chord, CAN, Bamboo, Kademlia, and so on.

In some embodiments that utilize a centralized registry system, a central server may maintain the registry, where the registry may be a central repository accessible by one or more call agents. In one embodiment, a given call agent may send a phone number or prefix to a central data store, and the central data store will store the phone number or prefix. Other call agents may query the central data store, and retrieve the mapping from the phone number to the identity of the call agent. In another embodiment, the central registry may hash the phone number or prefix and store the hashed phone number or prefix in the registry.

In some embodiments that utilize a hierarchical registry system, such as the domain name system (DNS), a given call agent may transform the phone number or prefix into a hierarchical identifier, for example, by utilizing a telephone number mapping protocol, such as the Electronic Numbering (ENUM) protocol defined by the IETF in RFC 2916. The call agent may then use this identifier to write the VoIP call routing information into the hierarchical system at the appropriate location. The servers in the hierarchy may be the same as the call agents, or different. If the DNS is used as the hierarchical system, this may be a public DNS or a private DNS.

In some embodiments, a given call agent may receive a telephone number in a call initiation message from an originating client or an originating call agent, and then use the telephone number to lookup VoIP call routing information in the registry. In one embodiment, the call agent may search the registry for each of the N−1 prefixes of the N-digit destination number. Searches may be based on exact matches, as opposed to hierarchical matches. In other words, one address block should be found, and if more than one address block is found, the most specific one is used. Assuming there is a matching entry in the registry, the identity of the terminating call agent for that number or number block (which includes the IP address and port number of the destination call agent) that was found may be cached to avoid queries in the future.

In particular embodiments, where the registry stores hashed telephone numbers or prefixes, a look up process implemented on a call agent may perform the following operations in order to look up VoIP call routing information. FIG. 3 illustrates an example process flow implemented at a call agent directed to looking up VoIP call routing information in the registry. Responsive to some event (such as receiving a call initiation message identifying a telephone number), the look up process computes a hash of an identified telephone phone number (302). The look up process then accesses the registry and determines if there is a matching entry, or specifically, if the hashed telephone number matches (based on an exact string match) any hashed numbers in the registry (304). If so, VoIP call routing information corresponding to the matching entry is returned (306) and possibly used in some other process implemented by the call agent. For example, in one embodiment, the IP address of the destination call agent corresponding to the telephone number may be used to route a VoIP call.

If there is no matching entry, the look up process determines if the telephone number is stripped to a minimum threshold number of digits (308). In one embodiment, the minimum threshold may be a predefined number of digits. For example, the minimum threshold number may be 1 digit (e.g., the smallest country code possible). If the telephone number is stripped to a minimum threshold number of digits, the look up process returns a "not found" message (310). The call agent 24 may respond to this message in a variety of manners depending on the context. For example, in one implementation, an originating call agent may attempt to make a PSTN call or may deny the call, optionally notifying the originating client of the call denial and optionally providing a reason for denying the call.

If the destination phone number is not stripped to a minimum threshold number, the look up process strips the last digit of the telephone number (312). The originating call agent then re-computes the hash of the modified telephone number (314) and determines if the re-computed hashed telephone number matches any hashed telephone numbers in the registry (304). The call agent may continue this process until a matching entry is found or until the destination phone number has been stripped down to the minimum threshold number.

This process provides security to the system, because without a legitimate phone number, the process would be computationally expensive to acquire phone numbers. In one embodiment, policies may be applied to detect suspicious nodes that transmit queries that result in greater than a threshold number of failures over a sliding window of time.

As described in more detail below, a given call agent may use the facilities of a PSTN to validate VoIP call routing information in the registry. For example, a call agent may verify that another call agent can legitimately claim ownership of a telephone number the call agent wrote into the registry. Here, "ownership" may imply the property that, had the call been made over the PSTN, the call would have been routed to the call agent which wrote the entry into the registry, or if not that call agent, another call agent under the same administrative control. For example, a call agent, responsive to an identified telephone number, may make a PSTN call to that telephone number over PSTN 26. Generally, if the call agent claiming ownership of the destination telephone number is authentic, the call agent will receive the PSTN call over PSTN 26 and will thus have an opportunity to record one or more attributes of the PSTN call, such as start time, end time, calling party identifier, and the like. The PSTN call attribute information can be used as a shared secret to allow the first call agent to validate the other call agent. As described in more detail below, verification of a call agent may occur during or after a PSTN call.

In the implementation described below, a given call agent may store verified VoIP call routing information in a local cache. The call agent, responsive to a call initiation message identifying a destination telephone number, may selectively place a PSTN or VoIP call to a given destination telephone number depending on the presence, or absence, of validated VoIP call routing information in the cache that corresponds to the destination telephone number. Matching validated routing information in the cache generally means that the terminating call agent has been verified. The originating call agent may then place a VoIP call by transmitting a call initiation message to the terminating call agent. If no validated match is found in the cache, but the number is in the cache as a consequence of a previous query to the registry, the call agent may place a PSTN call and validate the call agent. If no match is found in the cache at all, the call agent may query the registry for the number as described above, in addition to placing a PSTN call.

FIG. 4 illustrates an example process flow implemented at an originating call agent directed to selectively placing a PSTN or VoIP call responsive to a call initiation message from a calling node. As FIG. 4 shows, the process begins when the originating call agent (e.g., call agent 24a) receives a call initiation message, such as a SIP invite, from an originating (calling) node (e.g., client 28a) (402). In one embodiment, the call initiation message includes a destination telephone number.

The originating call agent accesses its cache to determine if there is a matching validated cache entry, whereby the cached address block is associated with the destination number, and the destination number has been validated previously (404). If there is a matching validated entry in the cache, the originating call agent makes a VoIP call, transmitting signaling messages to the terminating call agent associated with the matching address block in the local cache (406). This signaling message can be sent directly to the destination call agent, or can be sent through intermediate servers or providers.

If there is no matching validated address block in the cache, the originating call agent makes a PSTN call to the destination telephone number (408). As FIG. 4 shows, the originating call agent may also look up, using the telephone number, the terminating call agent in the registry (408), if the destination number is not in the cache at all. More specifically, in one embodiment, the originating call agent may use the destination phone number to look up VoIP call routing information of the destination call agent in the registry (see Section C, above). If a matching entry is found (412), the originating call agent may record one or more attributes of the PSTN call to be used in a subsequent verification process. In the implementation shown, the originating call agent, after the PSTN call ends (416), records one or more PSTN call attributes in a data store (e.g. a called-out database) (418), and adds the terminating call agent to a verification task list (420). In one implementation, the data store may be a temporary data store that stores the information for a period of time, or the data store may be a database with persistent storage. In another implementation, the PSTN call attributes can be recorded for every call, and then the registry can be queried as part of the procedures followed when executing the verification task list.

A variety of PSTN call attributes can be stored. In one implementation, the PSTN call attributes may include a PSTN call start time, a PSTN call stop time, call length (e.g., how long the call lasted), a caller ID of the calling client, and any other information that the originating VoIP network may be used to verify that the destination received the PSTN call. Other PSTN call attributes may include signatures of the voice data as computed by the originating and terminating gateways. For example, the call agents may compute the amount and start times of silent periods during a call, or a spectral signature of the voice data during the call. Other PSTN call attributes may include a sequence of DTMF tones that the originating gateway may transmit during some point in the call (e.g., just prior to call termination).

One advantage of the implementations describe herein is that they may be used with telephone numbers. Another advantage is that implementations described herein are undetectable by service providers. Because enterprises may still make PSTN calls, implementations described herein may reduce the volume of such PSTN calls.

Furthermore, other implementations are possible. For example, even if matching VoIP call routing information is found in the cache, the originating call agent (according to some randomized or other process) may nevertheless select the entry for re-validation, causing the call agent to make a PSTN call and to add the call agent to a verification list. Still further, call agent may apply an aging algorithm to its cache to flush old entries.

FIG. 5 illustrates an example process flow implemented at a destination or terminating call agent directed to recording one or more attributes associated with a received PSTN call. To allow for verification, a terminating gateway may record one or more attributes of a PSTN call in order to successfully answer queries from the originating call agent. As FIG. 5 illustrates, the destination call agent receives a PSTN call (502) and then forwards the PSTN call to the destination client (504). After the call ends (506), the destination call agent records the PSTN call attributes in a data store (e.g. a called-in database) (508). In one implementation, the data store may be a temporary data store that stores the information for a period of time. The foregoing section identifies example PSTN call attributes that the terminating call agent may record.

If the originating call agent performs the verification after the PSTN call, the originating call agent may perform the verification at various times depending on the specific implementation. For example, the originating call agent may perform verification immediately after the PSTN call. In other implementations, the originating call agent may verify multiple destination call agents in a batch process run at off-peak periods. In one implementation, the originating call agent may verify the destination call agent at a random time after the call is completed. The originating call agent may perform one or more verification operations upon a triggering event such as when receiving a new call initiation message.

As described in more detail below, the verification may be a knowledge-based verification, where the originating call agent queries the destination call agent for PSTN call attributes corresponding to one or more prior PSTN calls. The PSTN call attributes may be conceptualized as "shared secrets" that only those two call agents would know.

FIG. 6 illustrates an example process flow implemented at the originating call agent and associated with verifying the destination call agent. As FIG. 6 shows, for each destination call agent in the verification list, the originating call agent transmits a query for PSTN call attributes to the destination call agent (602). The query may be transmitted over a packet-based communications network using the IP address and port of the destination call agent learned from the registry.

The call agents may communicate according to a variety of different protocols. For example, in one implementation, the "called-in" database maintained by a destination call agent may be accessible to a verifying call agent by using a directory access. The originating call agent may send a query using the destination phone number as a key, and the terminating agent would return the recorded PSTN attributes for calls with that destination phone number. Any number of protocols can be used for this purpose, including standard database and directory protocols, such as LDAP and SQL, or HTTP queries, SOAP queries, or any other suitable technology for querying for a piece of data and getting a response.

In an alternative implementation, an actual authentication protocol can be used to improve security. In this implementation, the PSTN call attributes are mapped to a username and password, and then a traditional authentication or login protocol can be used to verify the data. For example, the user name may be the destination number and start time of the PSTN call, and the password may be the stop time of the PSTN call. As another example, the username can be the destination number and a random time in the middle of the call, and the password can be the start and stop times of the call. As another example, the username can be the destination number and caller ID, and the password can be the start time and stop time of the call. In one implementation, the PSTN call attributes may include information associated with the content of the PSTN call. For example, during a given PSTN call, both the originating and destination call agents may execute a silence detection algorithm to detect silence and talking. The VoIP may then generate a PSTN call signature or fingerprint based on the detected silence and talking patterns. This fingerprint or signature can be used as part of the username and/or password. For example, the username could be the destination number and start time of the call, and the password could be the fingerprint. Or, the username could be the destination number and signature over the first half of the call, and the password is the signature over the second half.

In one implementation, the PSTN call attributes may include a call signature or fingerprint. In one implementation, the originating call agent may execute frequency spectrum analysis or speech recognition algorithms to generate the call signature or fingerprint. In one implementation, the originating call agent may, prior to the end of the PSTN call, send a random string using dual-tone multi-frequency (DTMF) values that both call agents record. The call signature or fingerprint may then include the DTMF bits. In one implementation, the query may provide the destination call agent minimal information such as the call start time. Based on the limited information, the destination call agent may ascertain the appropriate information to provide.

When the originating call agent receives a response to the query for PSTN call attributes (604), the originating call agent determines if the PSTN call attributes are confirmed (606). In one implementation, the PSTN call attributes are confirmed if the PSTN call attributes in the response from the destination call agent match the PSTN call attributes that the originating call agent stored in the "called out" database. In one implementation, when an authentication or log-in protocol is utilized, the PSTN call attributes are confirmed if the log-in or authentication protocol succeeds. In one implementation, the authentication protocol may function without transmitting the PSTN call attributes from either call agent during authentication. For example, the authentication protocol may be based on an Encrypted Key Exchange (EKE) protocol that provides zero-knowledge password proof. In one implementation, the validation may fail due to a given PSTN call being forwarded to an illegitimate call agent.

If the PSTN call attributes are confirmed, the originating call agent applies an appropriate policy for verified destination call agents (608). For example, the originating call agent mark the entry in the cache for this number as being validated, resulting in future VoIP calls subsequently being made to that call agent, as discussed above. That is, if the VoIP routing information is validated for the first time, the originating call agent will find a matching entry in the cache the next time, and will thus able to make a VoIP call to the now verified call agent. As such, no subsequent search to the registry would be necessary.

Furthermore, the verifying call agent may establish a connection to the verified call agent for routing of VoIP call initiation messages. In one implementation, once a Transmission Control Protocol (TCP)/Transport Layer Security (TLS) connection is established, the originating call agent may send an SIP invite directly to the destination call agent. In one implementation, a given call agent may maintain multiple TCP/TLS connections up to a predefined number (e.g., 1,000 connections), after which the call agent may terminate an inactive or the least active connection.

If the PSTN call attributes are not confirmed, the originating call agent applies an appropriate policy for unverified destination call agents (610). For example, the originating call agent may log the verification failure in the cache, generate an alert message, add the call agent to a black list and the like, etc.

Implementations of the verification process may be optimized in a variety of ways. In one implementation, even if a given phone number or prefix is stored/validated in the cache, the verification may be augmented to cause a revalidation. For example, in one implementation, the originating call agent may randomly select some calls to re-verify that the destination call agent still owns the particular phone number of phone number block. In one implementation, the originating call agent may re-verify a predefined percentage of the calls (e.g., 5%) or a random number of calls. In another implementation, the call agent may timeout the validation after a configured period of time, for example, one month, so that re-verification is performed once a month.

In another optimization, when a particular number in a block has been verified, other numbers in that same block can also be considered verified. For example, if number A and number B within a block have been verified, the call agent can consider all numbers between A and B within that block to also be verified. In one implementation, this automatic verification can happen only when numbers A and B are close to each other, for example within 1000 numbers.

In another implementation, the shared secret may be defined based on the last N PSTN calls, improving the security of the mechanism. In one embodiment, instead of basing the PSTN call attributes on the last N calls between any two telephone numbers in a given block, the PSTN call attributes may be based on the last N calls between specific telephone numbers. In one implementation, if the originating call agent may validate a predefined number or predefined percentage of telephone phone numbers of a given address block (e.g., 2 out of 50 telephone numbers, or 4%), the originating call agent may accept the remaining telephone numbers of the address block for future calls.

In one implementation, if the destination call agent is verified before the PSTN call ends, the originating call agent may optionally permit the PSTN call to continue even with the successful verification. As such, the VoIP call may be used for enhanced features on top of the voice portion of the calls (e.g., the PSTN call). For example, the originating call agent may use the PSTN call for voice and use the VoIP call for enhanced features such as video, sound, presence, Instant Messaging (IM), and/or data applications.

Accordingly, implementations provide advantages such as preventing call agents from claiming ownership to a telephone number that they actually do not own. Also, implementations do not require any special PSTN configurations.

FIGS. 7A and 7B illustrate an example process flow implemented at the originating call agent directed to verifying the destination call agent during a PSTN call. As FIG. 7A shows, the process begins when the originating call agent receives a call initiation message such as a SIP invite from an originating client (702). In one embodiment, the call initiation message includes a destination telephone number.

The originating call agent accesses its cache to determine if there is a validated matching entry with an address block associated with the destination number (704). If so, the originating call agent makes a VoIP call (706).

If there is not a matching validated entry in the cache, the originating call agent looks up the destination call agent in the registry (708). If a match is not found (710), the originating call agent makes a PSTN call (712).

If a match is found (710), the originating call agent still makes a PSTN call (714) and also performs the following steps. The originating call agent records the PSTN call attributes in a data store (e.g. a called-out database) (716). As described above, in one implementation, the data store may be a temporary data store that stores the information for a period of time. In one implementation, the PSTN call attributes may include a PSTN call start time, a caller ID of the destination client, voice signature information (such as spectral analysis or silence/activity periods), DTMF, and any other information that the originating call agent may use to verify that the destination call agent is connected during the PSTN call.

Referring to FIG. 7B, while the PSTN call is still in progress, the originating call agent transmits a query for PSTN call attributes to the destination VoIP (718). In particular implementations, the query may request that the destination call agent provides similar information as the query described above in connection with step 602 of FIG. 6, except that the PSTN call attributes would not include a call stop time or a call length, as the PSTN call would still be in progress.

In one implementation, when the destination call agent receives a PSTN call, the destination call agent forwards the PSTN call to the destination client, and records the PSTN call attributes in a data store (e.g. a called-in database). Upon receiving the query for PSTN call attributes, the destination call agent sends a response. When the originating call agent receives the response to the query for PSTN call attributes (720), the originating call agent determines if the PSTN call attributes are confirmed (722). If the PSTN call attributes are confirmed, the originating call agent applies an appropriate policy for verified destination call agents (724). For example, the originating call agent may cache the VoIP call routing information, so future calls may go over VoIP. Or, the originating call agent may transfer the PSTN call in-progress to a VoIP call. If the PSTN call attributes are not confirmed, the originating Call agent applies an appropriate policy for unverified destination call agents (726). For example, the originating call agent may log the verification failure in the cache, generate an alert message, end the call, etc.

In one embodiment, if an attacker claims a telephone number that the attacker does not actually own, no call will ever be made to the attacker over VoIP, because the terminating call agent of the attacker would not be able to successfully respond to a query for PSTN call attributes, since the PSTN call would have gone to the actual owner of the telephone number.

In one embodiment, if an attacker claims ownership to a larger prefix than the attacker actually owns, the attacks may not be detected initially but would probably be detected. This is because some of the calls can be expected to be made over the PSTN, thereby assuring that the falsified numbers are eventually tried and detected. In one implementation, an enterprise may require that a PSTN call be made at least once to any particular destination telephone number. While this may cause more PSTN calls to be made, this would eliminate such attacks.

Because the registry is not used at the initial call setup time, any latency has no impact on call setup delays. Indeed, call setup times using implementations disclosed herein will be faster than even over the PSTN, because the originating call agent communicates directly with the destination call agent. In many cases, not even a Transmission Control Protocol (TCP) connection setup is required, because such a connection may have already been established and maintained as a consequence of a previous call to that terminating call agent.

However, in another implementation, when a PSTN call arrives at the terminating call agent, the terminating call agent holds the call and does not deliver the call yet to the terminating client. Rather, the terminating call agent examines the caller ID from the PSTN call setup message, and queries the registry for this number. If a match is found, the terminating call agent further holds the call in anticipation of receiving a request to verify the PSTN call attributes. Once this validation has succeeded, the originating call agent can place a VoIP call, and the terminating call agent can reject the PSTN call and proceed with the VoIP call. This eliminates the need for a PSTN call to actually be completed, but increases call setup delays as a consequence.

Furthermore, implementations disclosed herein are failsafe in that the originating call agent may make PSTN calls even when the destination call agent is verified against the cache or against the registry. In other words, even if a given originating call agent crashes and recovers, losing its cache, or if the registry is compromised in some way, or any of a number of problems occur, the worst case is that calls still get routed over the PSTN. As such, the end user experiences no disruption in service. Some P2P VoIP overlay network providers need to provide centralized servers that hand out user names within their network and hand out certificates. Because implementations described herein utilize telephone numbers that have already been issued to an enterprise, no such central services are required.

As described in more detail below, the cache maintained by the call agent and the registry may be used to verify caller ID information in received VoIP calls. For example, when a given destination call agent receives a call initiation message over a packet-based communications network (e.g., SIP invite) having an associated caller ID containing a phone number, the destination VoIP may verify the caller ID against the cache of the call agents and/or against the public registry. This provides two levels of validation.

FIG. 8 is a flow chart implemented at the destination call agent and associated with verifying the caller ID in a received call setup message. As FIG. 8 shows, the destination call agent receives a call initiation message such as a SIP invite from an originating call agent (802). In one implementation, the call initiation message contains a caller ID. The destination call agent searches its cache for a matching entry to determine if the caller ID matches a phone number in the cache, and whether that number has been verified. If that number has been verified, the call agent checks if the identity of the entity sending the call setup request matches the identity of the call agent that was verified (based on matching certificates used in TLS procedures, or based on matching IP addresses, or any other suitable means of comparison) (804). If so, the destination call agent applies one or more policies for originating call agents that are validated against the cache (806). For example, in one implementation, the destination call agent may indicate to the user of the destination client that the sender (originating call agent) is verified. In one implementation, the destination call agent may selectively show the caller ID, or add a symbol or character indicating a valid caller ID. In one implementation, the destination call agent may permit the call, etc.

If the caller ID has not been verified, but matches a number in the cache, or the caller ID does not match any number in the cache, the destination call agent may look for a matching entry in the registry (808, 810). If there is a matching entry in the registry or in the cache, and the identity of the call agent in the registry entry (which may have been cached) matches the identity of the agent that sent the call setup request (based on matching certificates used in TLS procedures, or based on matching IP addresses, or any other suitable means of comparison) the destination call agent applies one or more policies for originating call agents that are validated by the registry (812). Similar to the one or more policies that may be applied in step 806, in particular implementations, the destination call agent may indicate to the user of the destination client that the sender (originating call agent) is verified (and optionally indicate a second level of validation), may show the caller ID, may permit the call, etc. If the caller ID does not match a phone number in the registry, the destination call agent applies one or more policies for unvalidated originating call agents (814). For example, in one embodiment, the destination call agent may indicate to the user of the destination client that the sender is unverified, or may show no caller ID, or may deny the call, etc.

Because a malicious call agent may provide a false caller ID, this process enables a given call agent to provide caller ID information to two levels of verification. As described above, the VoIP may utilize the cache or the registry to verify the caller ID against previous verifications or against an IP address and port number, the former of which cannot be falsified. Accordingly, implementations described herein have an advantage of preventing caller ID spoofing. For example, if an originating call agent of an enterprise launches a SIP call with a fake caller ID, the fake caller ID may match an entry corresponding to a call agent of a different enterprise.

In one implementation, in addition to verifying the caller ID against the cache or against the registry, the destination call agent may also verify the originating call agent according to the verification processes described above in connection with FIGS. 4, 6, 7A, and 7B. As such, an originating call agent using a fake ID would not be able to successfully respond to a request for PSTN call attributes.

In one embodiment, the originating and destination call agents may verify each other based on the same call. For example, in one implementation, the originating call agent may make both a PSTN call and a VoIP call to the destination call agent. When receiving the PSTN call, if the destination call agent determines that the caller ID corresponds to another call agent in the network, the destination call agent holds the PSTN call for predefined time period (e.g., a few seconds). When the VoIP call arrives, mutual authentication is performed. In other words, the originating and destination call agents verify each other as described above. If mutual authentication succeeds, the PSTN call is rejected and the VoIP call proceeds.

This approach provides highly reliable validation of the advertised number blocks in the P2P network, as well as provides a VoIP anti-spam function. In one implementation, if an originating call agent is making too many VoIP calls, even though the originating call agent is validated, the terminating call agent can reject incoming VoIP calls from that call agent, and redirect the incoming VoIP calls to utilize the PSTN instead. This passes costs onto the originating call agent and therefore helps alleviate VoIP spam.

Also, because this technique uses telephone phone numbers, the technique may make it difficult for a spammer to change identifiers. Changing identifiers in email is inexpensive and easy, because domains and user IDs within a domain are practically free and in infinite supply. This is not so with telephone numbers, which are a more expensive and a finite resource. Furthermore, because telephone numbers are used, an enterprise that is spamming can be traced back through its service provider. Black lists also become much more effective, because of the finite namespaces of phone numbers.

In one implementation, the validation of VoIP routes may be separated from the call agent. A validation server—instead of the call agent—may validate ownership of a telephone number or otherwise communicate with the registry. The separation may result in: (1) elimination of use of the call agent to connect to the P2P network; (2) a decoupling of the call agent from the details of how VoIP routes are learned; (3) elimination of use of the validation server during the setup of outgoing calls; and (4) the validation server may learn VoIP routes for multiple call agents.

The elimination of the need for the call agent to connect to the P2P network may be desirable. Administrators may be reluctant in some cases to permit the call agent to be connected to the P2P network. Call agents may be considered by administrators to be critical infrastructure. Being connected to the P2P network may require the call agent to process background P2P traffic. Additionally, traffic sent and received on the P2P network may be encrypted. Unlike VoIP traffic, a firewall and/or a session border controller may not be able to monitor the encrypted P2P network traffic.

Separation of Validation Services

FIG. 9 illustrates an example of a system 100 that separates validation services from the services of the call agent 24. The system 100 may include a validation server 102, the call agent 24, a firewall 104, and clients 28 of the call agent 24. The system 100 may include different, fewer, or more components. For example, the system 100 may not include the firewall 104. In one example the system 100 may include just the validation server 102. In a second example, the system 100 may include multiple call agents 24. In a third example, the registry 108 may be stored in the P2P network, which may be maintained in validation server 102, in other validation servers, in other call agents, or in any combination thereof. Alternatively, the system 100 may include the registry 108 as a centralized repository, such as a Telephone Number Mapping (ENUM) server.

The validation server 102 may include one or more processes to validate VoIP routes and communicate with the registry 108. In one example, the validation server 102 may include a processor 110 and a memory 112. In a different example, the validation server 102 may be software without hardware.

The memory 112 may be may be any now known, or later discovered, data storage device. The memory 112 may be a non-volatile and/or volatile memory, such as a random access memory (RAM), a read-only memory (ROM), an erasable programmable read-only memory (EPROM), or flash memory. The memory 112 may include an optical, magnetic (hard-drive) or any other form of data storage device.

The processor 110 may be in communication with the memory 112. The processor 110 may also be in communication with additional components, such as a display. The processor 110 may be a general processor, central processing unit, server, application specific integrated circuit (ASIC), digital signal processor, field programmable gate array (FPGA), digital circuit, analog circuit, or combinations thereof. The processor 110 may be one or more devices operable to execute computer executable instructions or computer code embodied in the memory 112 or in other memory to validate VoIP routes.

The call agent 24 may be in communication with the validation server 102. The call agent 24 may also be in communication with the PSTN 26 and the Internet 22. Additionally, the call agent 24 may be in communication with the clients 28.

In addition to the validation server 102 being in communication with the call agent 24, the validation server 102 may be in communication with the registry 108 over the Internet 22. The firewall 104 may be between the Internet 22 and the validation server 102 and/or between the Internet 22 and the call agent 24.

During operation of the system 100, the validation server 102 may perform validation services and communicate with the registry 108. For example, the validation server 102 may communicate with the registry 108 using the P2P protocol or any other suitable protocol used to communicate with the registry 108. The validation server 102 may also communicate with VoIP agents using an authentication protocol to validate the VoIP agents for a telephone number or for a range of telephone numbers. The validation server 102 may perform P2P functions when the registry 108 is implemented as a P2P network. For example, the validation server may route P2P messages based on finger tables included in a portion of the P2P registry data 118 included in the validation server 102.

The validation server 102 and the call agent 24 may communicate using a validation access protocol (VAP). VAP may be any protocol used to communicate information between the validation server 102 and the call agent 24 to facilitate the separation of validation services from services of the call agent 24. For example, the call agent 24 may use VAP to inform the validation server 102 of the telephone numbers for which the call agent 24 claims ownership. In one example, the call agent 24 may transmit the owned telephone numbers 114 to the validation server 102 in the form of an XML document that includes Direct Inward Dialing (DID) information. The validation server 102 may store at least a portion of the owned telephone numbers 114 in the memory 112. For example, the portion of the owned telephone numbers 114 may include a range of phone numbers identified by a prefix. Alternatively or additionally, the call agent 24 may ask the validation server 102 to place a portion of the owned telephony numbers 114 into the registry 108, without storing them in the validation server 102. Alternatively or additionally, the owned telephone numbers 114 stored in the memory 112 of the validation server 102 may be entered by a user instead of received from the call agent 24.

The validation server 102 may also store the owned telephone numbers 114 or a portion of the owned telephone numbers 114 in the registry 108. When the registry 108 is implemented as a P2P network, the portion of the P2P registry data 118 may be stored in the memory 112 of the validation server 102. By storing the owned telephone numbers in the registry 108, the validation server 102 may advertise the call agent 24 as owning the telephone numbers. By transmitting the owned telephone numbers 114 to the validation server 102, the call agent 24 may control which telephone numbers are stored in the registry 108 without being directly connected to the P2P network. Additionally, the validation server 102 may advertise owned telephone numbers 114 for more than one call agent 24.

The call agent 24 may use VAP to inform the validation server when the call agent 24 makes and/or receives PSTN calls. For example, the call agent 24 may transmit call attributes to the validation server 102 for outgoing and incoming PSTN calls. The call agent 24 may indicate whether the call is an outgoing or incoming PSTN call. The validation server 102 may store the call attributes 116 received from the call agent 24 in the memory 112 of the validation server 102. The validation server 102 may use the call attributes 116 of the PSTN calls to verify call agents as valid call agents for telephone numbers or ranges of telephone numbers.

The process to verify the call agents for the telephone may be any one of the processes described above for verifying call agents. To verify the call agents as valid call agents for telephone numbers, the validation server 102 may communicate with the registry 108 and the call agents. To communicate with the registry 108, the validation server 102 may use any suitable registry protocol, such as a P2P protocol. For example, the validation server 102 may query the registry 108 for a destination telephone number using a hash-based prefix match. The validation server 102 may communicate with the call agents using one of the authentication protocols described above. For example, the validation server 102 may initiate a TLS connection to the call agent found as a result of querying the registry 108. The validation server 102 may generate, exchange, and store the password used during authentication to verify a call agent for the destination telephone. In one example, the validation server 102 may communicate with a different validation server that is used by the call agent to be verified instead of communicating with the call agent directly.

In one example, the validation server 102 may discover and verify a call agent for the destination telephone number immediately after receiving the call attributes for the destination telephone number from the call agent 24. In a different example, the validation server 102 may wait a random amount of time after receiving the call attributes before discovering and verifying the call agent for the destination telephone number. In one example, the validation server 102 may periodically verify the destination number.

After the validation server 102 verifies one of the call agents for a telephone number based on the call attributes 116, the validation server 102 has learned a new VoIP route. A VoIP route may map a destination telephone number to a call agent. Alternatively or in addition, the VoIP route may map a prefix, such as a portion of the destination telephone number, to the call agent. In one example, the VoIP route may include a destination telephone number and a network address of the call agent to which the destination telephone number is mapped. The validation server 102 may transmit the new VoIP route to the call agent 24 over VAP. The call agent 24 may store the new VoIP route for use in subsequently initiating VoIP calls to the destination telephone number.

The validation server 102, the call agent 24, or both may store validation information, such as usernames and passwords, used when initiating new calls to the call agents. In one example, the validation server 102 may transmit the validation information to the call agent 24 when transmitting the new VoIP route to the call agent 24. Alternatively or in addition, the call agent 24 may transmit a request for the validation information to the validation server 102 as part of initiating a new call to the call agent identified in the new VoIP route. In one example, the validation information may include a ticket issued by the call agent that is identified in the new VoIP route.

Upon receipt of the valid VoIP route, the call agent 24 may store the route in a cache of valid VoIP routes 120. The cache of valid VoIP routes 120 may be included in the call agent 24 or stored in a database separate from the call agent 24. Multiple call agents 24 may access the cache of valid VoIP routes 120 stored in the database. In one example, the multiple call agents 24 may share a common validation server 102. Alternatively or in addition, the validation server 102 may store the valid VoIP routes 120 in the database instead of transmitting the valid VoIP routes 120 to the call agent 24 using VAP. In one example, the call agent 24 may periodically transmit a request to the validation server 102 for valid VoIP routes 120. Alternatively or in addition, if there are multiple call agents 24, the validation server 102 may transmit the VoIP route to all of the call agents 24.

The call agent 24 may receive a call initiation message from one of the clients 28, where the call initiation message identifies a destination telephone number. When the call agent 24 receives the call initiation message, the call agent 24 may search the valid VoIP routes 120 for the VoIP route matching the destination telephone number. If the call agent 24 finds a matching VoIP route, the call agent 24 may initiate a VoIP call based on the matching VoIP route instead of initiating a PSTN call. However, if the call agent 24 does not find a matching VoIP route, the call agent 24 may initiate a PSTN call. In one example, upon receipt of the call initiation message from one of the clients 28, the call agent 24 may transmit a request to the validation server 102 for a valid VoIP route corresponding to the destination telephone number. If the validation server 102 returns the valid VoIP route, the call agent 24 may initiate the call to the call agent identified in the valid VoIP route. Otherwise, the validation server 102 may initiate the call over the PSTN 26.

In one implementation, the call agent 24 may determine whether the destination telephone number is a telephone number internal to an enterprise associated with the call agent 24 or whether the destination telephone number is to a telephone number external to the enterprise. The telephone number external to the enterprise may be reachable over the PSTN 26 and/or the Internet 22. If the destination telephone number is internal to the enterprise, the call agent 24 may route the call accordingly and avoid issuing a request to the validation server 102.

The call agent 24 may receive a call initiation message from an originating call agent on the Internet 22. In one implementation, the call agent 24 may transmit a request to the validation server 102 to validate the call initiation message. For example, the call agent 24 may transmit a password and call information included in the call initiation message to the validation server 102 for validation. The validation server 102 may send a response back to the call agent 24 indicating whether the call initiation message is valid. The validation server 102 may reject the call if the call initiation message is invalid and accept the call initiation message otherwise. In one implementation, the call agent 24 may validate the call initiation message without the validation server 102. In one implementation, the call agent 24 may accept the message without validation of the call.

The call agent 24 may periodically flush or remove valid VoIP routes 120. For example, each one of the VoIP routes 120 received from the validation server 102 may have an expiration date. The call agent 24 may remove or not use any expired VoIP routes 120 from the cache of valid VoIP routes.

In one example, the firewall 104 may send a request to the validation server 102 to validate a call initiation message received from an originating call agent on the Internet 22. If the validation server 102 indicates the message is invalid, then the firewall 104 may be configured to not forward the message to the call agent 24. Alternatively or in addition, the firewall 104 may validate the call initiation message without sending the request to the validation server 102.

VAP may be based on Internet Protocol or any other suitable protocol. In one example, VAP may be based on transport control protocol/Internet Protocol (TCP/IP) or TCP/TLS. VAP may include programmatic interfaces for at least one of the following: (1) to communicate the owned telephone numbers 114 of the call agent 24, (2) to communicate the call attributes 116, (3) to communicate the valid VoIP routes 120, and (4) verify passwords included in call initiation messages. Alternatively or in addition, VAP may be based on an inter-process communication (IPC) protocol, such as named pipes, anonymous pipes, Common Object Request Broker Architecture (CORBA), Simple Object Access Protocol (SOAP), Distributed Component Object Model (DCOM), or any other Remote Procedure Call (RPC) protocols. VAP may include connection pooling, connection keep-alive and/or other features for maintaining and/or optimizing connectivity between the validation server 102 and the call agent 24.

The separation of the functionality between the validation server 102 and the call agent 24 may result in the validation server 102 not being required to set up a new call. Instead, the validation server 102 may be used to learn new valid VoIP routes and to transmit the valid VoIP routes to the call agent 24 for later use.

Reputation System

As explained below, the validation server 102 and/or the call agent 24 may avoid making any PSTN call to a telephone number and still verify an identity of a node asserting ownership of the telephone number. The validation server 102 and/or the call agent 24 may verify the identity of the asserted owner of the telephone number based on the extent to which the validation server 102 and/or the call agent 24 trusts one or more nodes that claim to have verified the identity of the asserted owner of the telephone number. For example, the validation server 102 and/or the call agent 24 may determine the extent to which the validation server 102 and/or the call agent 24 trust the one or more nodes based on a reputation system.

Figure 10:
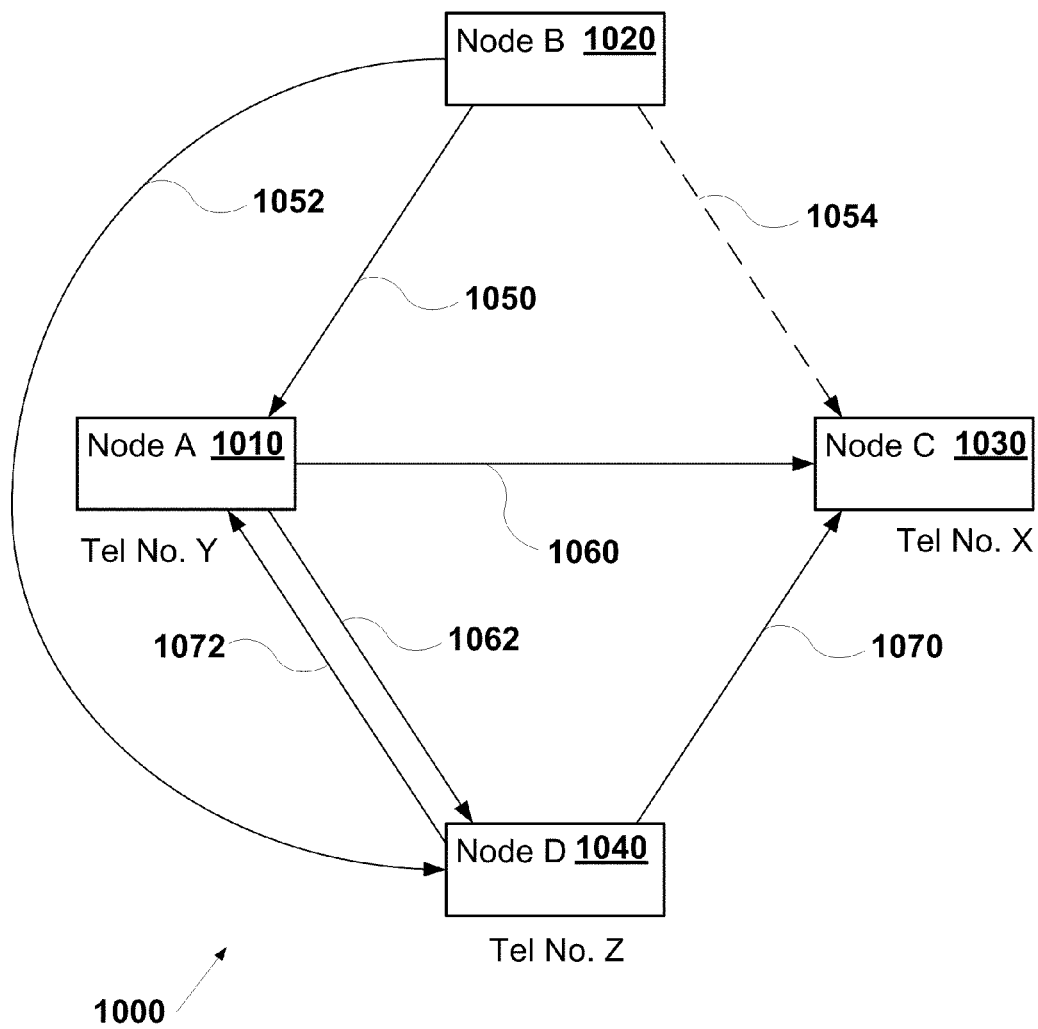
FIG. 10 illustrates an example of a system to validate call agents based on trust relationships among nodes.

FIG. 10 illustrates an example of a system 1000 to validate call agents 24 based on trust relationships 1050, 1052, 1054, 1060, 1062, 1070, and 1072 among nodes 1010, 1020, 1030, and 1040. The system 1000 may include nodes 1010, 1020, 1030, and 1040 and trust relationships 1050, 1052, 1054, 1060, 1062, 1070, and 1072 between the nodes. The system 1000 may include additional, fewer, or different components. For example, the system 1000 may include the registry 108, where the nodes 1010, 1020, 1030, and 1040 are in communication with the registry 108.

Each one of the nodes 1010, 1020, 1030, and 1040 may be a device, a process executed on the device, or any combination thereof that may validate an identity of another node. Examples of the nodes 1010, 1020, 1030, and 1040 include the validation server 102, the call agent 24, multiple validation servers in an administrative domain, multiple call agents in an administrative domain, and any combination thereof. In one example, any one of the nodes 1010, 1020, 1030, and 1040 may include a member of peer-to-peer network. In a second example, any one of the nodes 1010, 1020, 1030, and 1040 may be in communication with the registry 108 over a centralized server-based network, where the registry 108 is a centralized server. In FIG. 10, the nodes 1010, 1020, 1030, and 1040 are individually designated Node A, Node B, Node C, and Node D, respectively. Node A 1010, Node C 1030, and Node D 1040 own telephone numbers Y, X, and Z, respectively. An administrative domain refers to a realm of administrative autonomy, authority, and/or control. For example, in the Internet, a domain name may identify a particular administrative domain.

Each one of the trust relationships 1050, 1052, 1054, 1060, 1062, 1070, and 1072 between any two or more of the nodes 1010, 1020, 1030, and 1040 indicates to what extent one of the nodes 1010, 1020, 1030, and 1040 trusts at least one of the other nodes 1010, 1020, 1030, and 1040. Any one of the trust relationships 1050, 1052, 1054, 1060, 1062, 1070, and 1072 may be from a first node to a second node. In additional examples, any one of the trust relationships may be from the first node to multiple nodes, bidirectional between the first node and the second node, or bidirectional between the first node and the multiple nodes.

Each one of the trust relationships 1050, 1052, 1054, 1060, 1062, 1070, and 1072 may include a level of trust that quantifies the trust level. For example, each one of the trust relationships 1050, 1052, 1054, 1060, 1062, 1070, and 1072 may include one of at least two trust levels: "trust-validation" and "untrusted-validation." "Trust-validation" indicates that one of the nodes 1010, 1020, 1030, and 1040 has validated that one of the other nodes, 1010, 1020, 1030, and 1040, does in fact own a particular phone number as a consequence of proof of knowledge of a prior PSTN call. Conversely, "untrusted-validation" indicates that one of the nodes 1010, 1020, 1030, and 1040 has failed validation against a phone number based on a prior PSTN call with one of the nodes 1010, 1020, 1030, and 1040 in the trust relationship. Consequently, the "trust-validation" and "untrusted-validation" relationships may exist for an individual phone number or phone number prefix. Between a pair of nodes, there can be multiple trust relationships with different levels. For example, node A may "trust-validation" node C for phone number X, but node A may consider node C "untrusted-validation" for phone number Y. Alternatively or in addition, the level of trust in each respective one of the trust relationships 1050, 1052, 1054, 1060, 1062, 1070, and 1072 may be quantified into more than two different levels of trust.

The nodes 1010, 1020, 1030, and 1040 may store the trust relationships 1050, 1052, 1054, 1060, 1062, 1070, and 1072 in the registry 108. Alternatively, or in addition, the nodes 1010, 1020, 1030, and 1040 may store the trust relationships 1050, 1052, 1054, 1060, 1062, 1070, and 1072 in the respective nodes 1010, 1020, 1030, and 1040. For example, the nodes 1010, 1020, 1030, and 1040 may store a portion of the trust relationships 1050, 1052, 1054, 1060, 1062, 1070, and 1072 in the registry 108 and the rest of the trust relationships 1050, 1052, 1054, 1060, 1062, 1070, and 1072 in the respective one of the nodes 1010, 1020, 1030, and 1040 that established the corresponding one of the trust relationships 1050, 1052, 1054, 1060, 1062, 1070, and 1072.

Node A 1010 may store the trust relationship in the registry 108 that indicates Node A 1010 trusts Node C 1030 due to a PSTN validation. The PSTN validation may be a validation of an identity of an owner of a telephone number based on demonstrated knowledge of at least one PSTN call. The information stored about the trust relationship may include a cryptographic hash value of telephone number X, an identity of Node A 1010, and an identity of Node C 1030. Examples of the identity of one of the nodes 1010, 1020, 1030, and 1040 include a network address, a domain name, a peer-to-peer node identifier, a telephone number owned by the node, any other type of identifier, and a cryptographic hash thereof.

During operation, the nodes 1010, 1020, 1030, and 1040 may establish the trust relationships 1050, 1052, 1054, 1060, 1062, 1070, and 1072 using any number of mechanisms. One such mechanism may include any of the PSTN validation mechanisms described above. For example, Node A 1010 may have previously called telephone number X owned by Node C 1030 over the PSTN. Thus, Node A 1010 may validate the identity of Node C 1030 for telephone number X based on Node C 1030 providing proof of knowledge of the PSTN call initiated to telephone number X. After receiving the proof of knowledge of the PSTN call, Node A 1010 may now trust Node C 1030 as the owner of telephone number X. This relationship is called "trust-validation" for telephone number X. Thus, Node A 1010 has established the trust relationship 1060 from Node A 1010 to Node C 1030 for telephone number X based on the PSTN validation. Alternatively, Node A 1010 may not trust Node C 1030 for telephone number X based on failure of the validation.

In one example, the trust relationship information in the registry 108 or elsewhere may indicate which of the nodes 1010, 1020, 1030, and 1040 trust a particular node to be the owner of a particular telephone number. When any of the nodes validates a target node for a particular telephone number using the PSTN validation, that node may store the corresponding trust information in the registry 108. Thus, a validating node, such as Node B 1020, may search the trust relationship information in the registry 108 to determine whether any of the other nodes 1020, 1030, and 1040 have validated the particular node for the particular telephone number.

For example, Node B 1020 may not have validated Node C 1030 for telephone number X. Node B 1020 may not have called telephone number X over the PSTN. However, Node B 1020 may query the registry 108 to determine whether any one of the other nodes 1020, 1030, and 1040 has validated Node C 1030 for telephone number X. In the example above, the query of the registry 108 would return the trust relationship information that indicates Node A 1010 trusts Node C 1030 for telephone number X because of the PSTN validation.

In addition to the "trust-validation" relationship, a node may have a "trust-blanket" relationship with another node. In this relationship, one node, such as node A, trusts that if another node, such as node B, has a "trust-validation" relationship with a third node, such as node C, for phone number X, then node A will consider node C to be a legitimate owner of phone number X. That, in turn, creates another trust relationship, "trust-proxy validation", between node A and node C. Like the "trust-validation" relationship, this trust relationship is for a particular phone number, and the trust relationship indicates that one node trusts that the other node is a legitimate owner for the phone number. However, the "trust-proxy validation" relationship builds this trust not based on direct validation of the number, but instead because the node has determined, through a blanket trust relationship or through other mechanisms, such as the reputation mechanism described below, that the other node is a legitimate owner of the phone number. In one example, the "trust-blanket" relationship may be based on administrative provisioning, as the "trust-blanket" relationship is based on a belief that the target of the trust is operating a legitimate and non-compromised system. For example, the manager of Node A might know the administrator of Node D, and consider the administrator of Node D trustworthy to properly operate Node D. In that case, the manager of Node A may create a "trust-blanket" relationship 1062 between Node A and Node D.

Alternatively or in addition, a node 1010, 1020, 1030, and 1040 may form the "trust-blanket" relationship on some other basis. For example, Node B 1020 may create the "trust-blanket" relationship 1050 with Node A 1010 by validating the identity of Node A 1010 for telephone number Y based on Node A 1010 providing proof of knowledge of a PSTN call initiated to telephone number Y from Node B 1020. The PSTN validation of Node A 1010 by Node B 1020 may provide a high enough level of trust of Node A 1010 to create the "trust-blanket" relationship.

If Node B 1020 has a "trust-blanket" relationship 1050 with Node A, then Node B 1020 may consider Node C 1030 to be the owner of telephone number X based on the two trust relationships, 1050 and 1060, without Node B 1020 calling telephone number X over the PSTN. Thus, Node B 1020 may create a "trust-proxy validation" relationship between Node B 1020 and Node C 1030 for telephone number X.

Alternatively or in addition, the trust-validation relationship from the validating node to one node, together with the trust-validation relationship from that one node to the target node, may be sufficient to create the trust-proxy validation relationship from the validating node to the target node. For example, Node B 1020 may have created the trust-validation relationship 1050 with Node A 1010 based on validating the identity of Node A 1010 for telephone number Y based on Node A 1010 providing proof of knowledge of a PSTN call initiated to telephone number Y from Node B 1020. The PSTN validation of Node A 1010 by Node B 1020 may provide a high enough level of trust of Node A 1010 to trust an assertion by Node B 1020 that Node C 1030 owns telephone number X.

Because the level of trust of the target node may depend on what other nodes assert about the target node, the system 1000 to validate call agents 24 based on trust relationships 1050, 1052, 1054, 1060, 1062, 1070, and 1072 may also include a system to determine a reputation of any of the nodes 1010, 1020, 1030, and 1040 based on the various trust relationships 1050, 1052, 1054, 1060, 1062, 1070, and 1072.

Thus, one mechanism to establish any of the trust relationships 1050, 1052, 1054, 1060, 1062, 1070, and 1072 may be based on the reputation of any one of the nodes 1010, 1020, 1030, and 1040. The reputation of the target node may be based on assertions from more than one node. For example, Node B 1020 may wait until a determined number of the nodes 1010, 1020, 1030, and 1040 in different administrative domains assert that Node C is the owner of telephone number X. The nodes asserting that Node C is the owner of telephone number X may be referred to as asserting nodes. In the example illustrated in FIG. 10, Node A 1010 and Node D 1040 are the nodes asserting that Node C is the owner of telephone number X.

Node B 1020 may not have any individual trust relationship, such as the "trust-blanket" relationship, with the asserting nodes that assert Node C is the owner of telephone number X. However, the mere fact that many nodes all have a "trust-validation" relationship with Node C 1030 for phone number X, may cause Node B 1020 to trust that Node C 1030 is in fact the owner of phone number X. In other words—the reputation of Node C 1030 for phone number X, as measured by the number of other nodes which have a "trust-validation" relationship with Node C 1030, may be used by another node, such as Node B 1020, to create a "trust-proxy validation" relationship with Node C 1030 for phone number X. The reputation of Node C may increase as the number of nodes in the group that assert to trust Node C as the owner of telephone number X increases.

Alternatively or in addition, the various trust relationships can be combined to make a determination about whether a node has a "trust-proxy validation" relationship with another node for a particular phone number. For example, Node B 1020 may have a "trust-blanket" relationship 1050 with Node A 1010. Node A 1010 may have a "trust-validation" relationship 1060 with Node C 1030. However, instead of creating a "trust-proxy validation" relationship with Node C, Node B may instead create that relationship based on whether Node C has a minimum reputation for the particular phone number. In one example, this minimum value may be less than the reputation that Node B would require Node C to have in order to establish a "trust-proxy validation" relationship with Node C when Node B does not have a "trust-blanket" relationship with any of the asserting nodes.

Alternatively or in addition, any other reputation-based mechanism now known or later discovered for determining a reputation of a node in a network may be used to determine at least one of the trust relationships 1050, 1052, 1054, 1060, 1062, 1070, and 1072. For example, the reputation of a node may be based on a more complex combination of "trusted-validation" and "untrusted-validation" relationships to that node. In one example, the "untrusted-validation" relationships might be weighted more heavily, so that a node with some validation failures must work harder to increase its reputation. In a second example, reputations developed outside of the validation process might be used. If the domain name of a particular node is known, the domain name's reputation as mail spammer may be obtained from services that track Internet spammers, such as Spamhaus. The reputation of the domain name of the node may be used to assess the node's reputation in the system to determine the reputation of any of the nodes 1010, 1020, 1030, and 1040 based on the various trust relationships 1050, 1052, 1054, 1060, 1062, 1070, and 1072.

As another example, the reputation of a node for a telephone number X may be based on the reputation of that node for one or more other telephone numbers. For example, if Node C 1030 is "trusted-validation" by both Node A 1010 and Node D 1040 for ten phone numbers, and Node C 1030 is not "untrusted-validation" by any nodes for those same ten phone numbers, then Node B 1020 may create a "trusted-proxy validation" relationship with Node C 1030 for a new, 11$^{th}$ number, based on the fact that Node C 1030 has been trusted for other numbers. The creation of the "trusted-proxy validation" relationship may also depend on the proximity of the new number to the other ten numbers which have already been validated. For example, the creation of a "trusted-proxy validation" relationship for a new telephone number may be limited to new numbers in the same geographic area as the previously validated numbers, or numerically adjacent or numerically close to the numbers that have been previously validated.

The telephone number owned by any node may include a completely qualified telephone number or a prefix. As explained above, the prefix indicates a range of telephone numbers. In one example, any one of the trust relationships 1050, 1052, 1054, 1060, 1062, 1070, and 1072 may be limited to a single respective telephone number or a range of telephone numbers. In a second example, any one of the relationships 1050, 1052, 1054, 1060, 1062, 1070, and 1072 may be valid for any telephone number. In one example, the "trust-validation" relationship 1060 between Node A 1010 and Node C 1030 may be limited to telephone number X or a range of telephone numbers if telephone number X is a prefix. However, the "trust-blanket" relationship 1050 between Node B 1020 and Node A 1010 may indicate that Node B 1020 trusts Node A 1010 for a subset of the assertions by Node B 1020 that another node owns a particular telephone number, perhaps based on a set of prefixes. Alternatively or in addition, the "trust-blanket" relationship 1050 between Node B 1020 and Node A 1010, may limit Node B's trust of any of Node A's assertions about what numbers Node A owns to assertions relating to ownership of telephone number Y.

Figure 11:
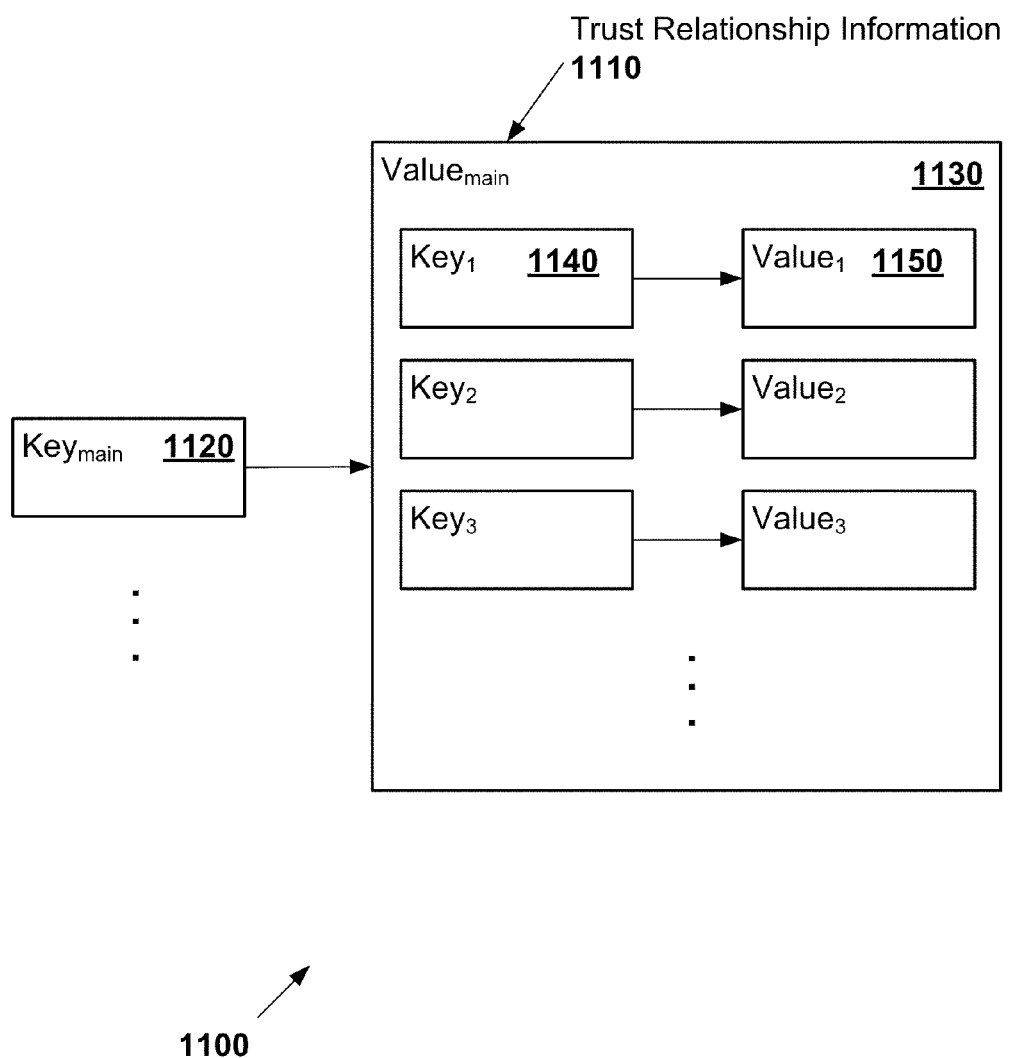
FIG. 11 illustrates an example structure of trust relationship information stored in a registry.

FIG. 11 illustrates an example of a storage structure 1100 for the trust relationship information 1110 stored in the registry 108. The storage structure 110 may include a set of main key-value pairs where each of the main key-value pairs includes a main key 1120 and a corresponding main value 1130.

In one example, the main key 1120 may be the telephone number for which the validating node validated the target node. In a second example, the main key 1120 may be a cryptographic hash of the telephone number for which the validating node validated the target node.

In one example, the corresponding main value 1130 may include a set of key-value pairs that correspond to validations by the different nodes 1010, 1020, 1030, and 1040 in the system 100. Each of the key-value pairs may include a key 1140 and a value 1150. The key 1140 may include an identifier of the validating node. The value 1150 may include an identifier of the target node that was validated. In a second example, the corresponding main value 1130 may include a list of node identifiers that identify the validating nodes. The identifier of the validating node or the target node may include, for example, a network domain name, a network address, a Universal Resource Locator (URL), a peer identifier, or any other type of identifier in a distributed system.

During operation, when the validating node validates the target node for a particular telephone number, the validating node may transmit the corresponding trust relationship information 1110 to the registry 108 for storage. For example, Node A 1010 may transmit the corresponding trust relationship information 1110 to the registry 108 when Node A 1010 validates Node C 1030 for telephone number X. For example, the validating node may execute a command, write(number, vnode, tnode), implemented in the registry 108, where the number is the telephone number validated, vnode is the identity of the validating node, and tnode is the identity of the target node. When the validating node transmits the trust relationship information 1110 for the target node and a particular telephone number, the registry 108 may search the registry 108 to determine whether a main key-value pair already exists in the registry 108, where the main key-value pair has the main key 1120 matching that particular telephone number. If such a main key-value pair does not already exist, then the registry 108 may create the main key-value pair for that telephone number. The registry 108 may add the trust relationship information 1110 for the validation executed by the validating node to any of the trust relationship information 1110 already included in the main value 1130. For example, when Node A 1010 validates Node C 1030 for telephone number X, the registry 108 may add the identifier of Node A 1010 and the identifier of Node C as the key 1140 and the value 1150, respectively.

When the validating node is to validate the target node for a particular telephone number based on existing trust relationships, the validating node may retrieve all of the trust relationship information 1110 in the registry 108 for that particular telephone number. For example, Node B 1020 may retrieve all of the trust relationship information 1110 in the registry 108 for telephone number X when Node B 1020 validates Node C 1030 for telephone number X. In the example illustrated in FIG. 10, the trust relationship information 1110 for telephone number X may include trust relationship information 1110 added by Node A 1010 and Node D 1040. In one example, the validating node may execute a command, read(number), implemented in the registry 108, where the number is the particular telephone number to validate. The command, read(number), may return all of the trust relationship information 1110 for the number.

In one example, the validating node may store the trust relationship information 1110 in the registry 108 only when the validating node performs the PSTN validation. In other words, only "untrusted-validation" and/or "trust-validation" relationships are stored in the registry. In a second example, the validating node may store the trust relationship information 1110 in the registry 108 when any validation of the target node is performed. In other words, "trust proxy-validation" information may also be stored in the registry. For example, the validating node may store the trust relationship information 1110 in the registry 108 whenever the validating node validates the target node based on the PSTN validation or whenever the validating node validates the target node based on an existing one of the trust relationships 1050, 1052, 1054, 1060, 1062, 1070, and 1072. For example, Node B 1020 may transmit the trust relationship information 1110 to the registry 108 when Node B 1020 validates Node C 1030 for telephone number X based on Node C's trust relation 1050 with Node A 1010 and Node A's trust relationship 1060 with Node C 1030.

The registry 108 may prevent storage of the trust relationship information 1110 received from the storing node. For example, the registry 108 may require the storing node to present a valid public key certificate as proof of the identity of the storing node before storing the identity of the storing node in the key 1140. If the storing node fails to present the valid public key for the storing node, then the registry 108 may prevent storing the trust relationship information 1110 indicating that the storing node asserts the target node owns a particular number.

If a new validating node may obtain, for a particular number, the identity of the target node that is identified in the trust relationship information 1110, the system 100 may provide little anonymity. However, the system 100 may provide an additional degree of anonymity. For example, instead of storing the identifiers of the validating node and the target node in the trust relationship information 1110, the validating node may store the identifier of the validating node without the identifier of the target node. Alternatively or in addition, even if both are stored in the registry 108, the registry 108 may return the identifier of the validating node without the identifier of the target node when asked for the trust relationship information 1110.

In one example, in order for a new validating node to determine the identity of the target node validated by the validating node for the particular telephone number, the validating node must have a trust relationship with the new validating node and that trust relationship must be sufficiently strong. For example, in order for the new validating node to determine the identity of the target node validated by the validating node, the new validating node may communicate with the registry 108 and/or the validating node that stored the trust relationship information 1110 in order to retrieve the identity of the target node validated by the validating node. The validating node may transmit the identity of the target node to the new validating node if the trust relationship with the new validating node is sufficiently strong. For example, the validating node may require the new validating node to demonstrate proof of knowledge of a PSTN call to a telephone number owned by the validating node. Alternatively or in addition, the validating node may require the new validating node to be included in a set of nodes trusted by the validating node.

The registry 108 may periodically remove trust relationship information 1110 for a particular telephone number. In one example, the registry 108 may delete trust relationship information 1110 that has been stored for longer than a threshold length of time. In a second example, if a sufficient number of the nodes 1010, 1020, 1030, and 1040 indicate that the trust relationship information 1110 for the particular telephone number is invalid, then the trust relationship information 1110 may be removed. One of the nodes 1010, 1020, 1030, and 1040 may determine that the "trust-validation" relationship information 1110 is invalid by performing a subsequent PSTN validation of the target node that fails. The sufficiency of the number of nodes may be determined if the number of nodes exceeds a threshold value.

Multiple target nodes may be legitimately validated for one telephone number and included in the trust relationship information 1110. For example, if two different validating nodes, each located in a different geographic area, dial the same number over the PSTN, each respective one of the validating nodes may reach different call agents. For example, dialing 2563470 from the United States may reach a different destination than dialing 2563470 from Germany. For the same reason, the VoIP call routing information stored in the registry 108 may also legitimately identify multiple call agents as owning the same telephone number. In one example, to address the multiple geographic area issue, the validating node may transmit the telephone number for storage in the trust relationship information 1110 in a fully qualified E.164 format that includes the country code. In addition, the telephone numbers stored in the registry 108 for the VoIP call routing information may be stored in a fully qualified format that includes the country code. In a second example, the validating node may limit consideration of the trust relationships 1050, 1052, 1054, 1060, 1062, 1070, and 1072 to the trust relationships to nodes 1010, 1020, 1030, and 1040 in the same calling area.

The storage structure 1100 of the trust relationship information 1110 may be any suitable structure different from the example illustrated in FIG. 11. For example, the trust relationship information 1110 may be stored across tables in a relational database.

Figure 12:
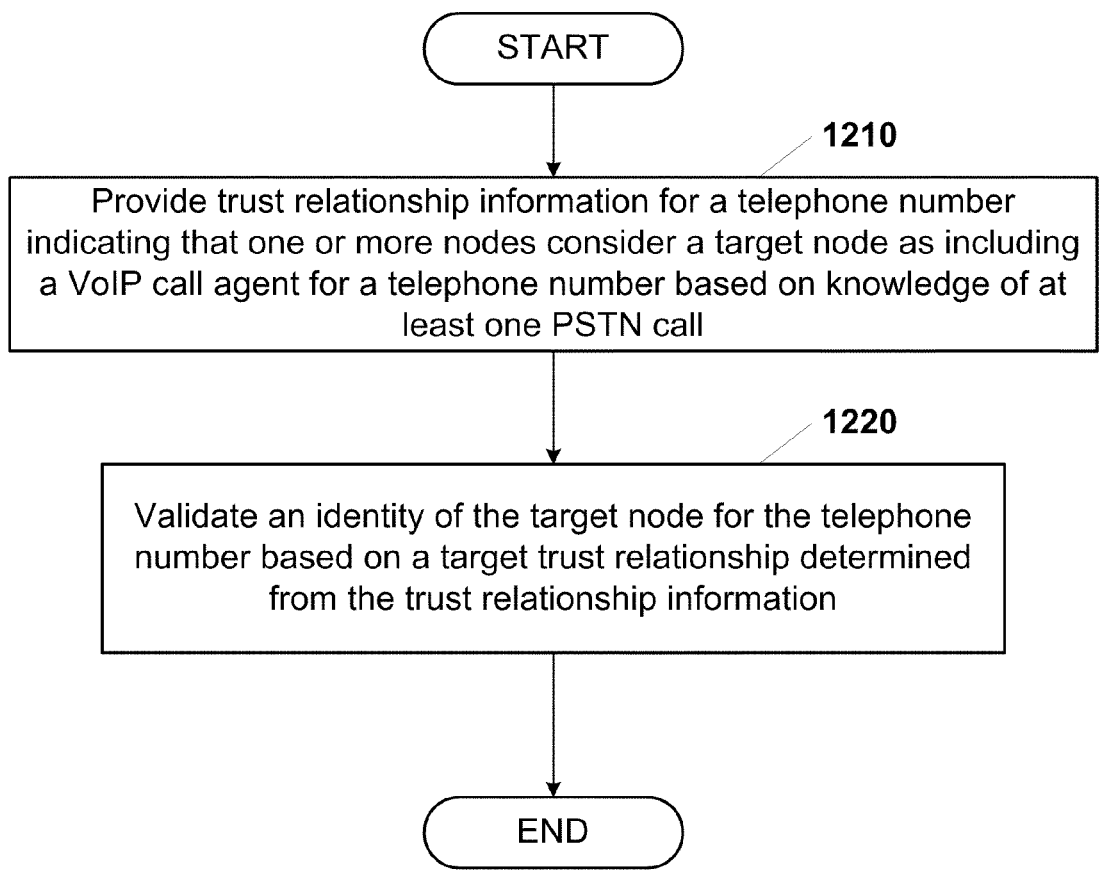
FIG. 12 illustrates one embodiment of a method to determine a trust relationship from a validating node to a target node.

FIG. 12 illustrates one embodiment of a method to determine the trust relationship from the validating node to the target node. Additional, different, or fewer acts may be performed. The acts may be performed in a different order than illustrated in FIG. 12.

In act 1210 of the embodiment illustrated in FIG. 12, the operation may begin by providing at least a portion of the trust relationship information 1110 for a telephone number. The trust relationship information 1110 may indicate that at least one node considers a target node as including or as being associated with the call agent 24 for the telephone number based on knowledge of at least one PSTN call. In one example, the portion of the trust relationship information 1110 may not include the identity of the target node.

The operation may continue in act 1220 by validating an identity of the target node for the telephone number based on a target trust relationship. For example, the target trust relationship may be a trust-validation relationship. The target trust relationship determined from the at least a portion of the trust relationship information 1110. The target trust relationship may indicate a level of trust that a validating node has in the target node being associated with or including the call agent 24 for the telephone number, the validating node and the at least one node being in a first administrative domain and a second administrative domain, respectively.

In one example, the operation may end by storing the target trust relationship in the registry. In a second example, the operation may include routing VoIP calls to the VoIP call agent based on the level of trust that the validating node has in the target node exceeding a threshold level.

The first call to the target node may be over the PSTN. However, subsequent calls to the target node, even from different nodes, may be routed as VoIP calls. Nevertheless, the first call to the target node may ensure that some validation of ownership of the telephone number is still preformed.

The embodiments described above are illustrative examples, so other embodiments are possible. For example, while embodiments described above have been described as operating in connection with P2P networks and PSTN networks, other embodiments may be used in connection with any suitable network environment.

Different components provide different functions for implementing the functionality of the various embodiments. The respective logic, software or instructions for implementing the processes, methods and/or techniques discussed above are provided on computer-readable storage media or memories or other tangible media, such as a cache, buffer, RAM, removable media, hard drive, other computer readable storage media, or any other tangible media or any combination thereof. The tangible media include various types of volatile and nonvolatile storage media. The functions, acts or tasks illustrated in the figures or described herein are executed in response to one or more sets of logic or instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system. Logic encoded in one or more tangible media for execution is defined as instructions that are executable by the processor and that are provided on the computer-readable storage media, memories, or a combination thereof. Any of the devices, features, methods, and/or techniques described may be mixed and matched to create different systems and methodologies.

What is claimed is:

1. A system comprising:
   a memory; and
   a processor in communication with the memory, the memory including computer code executable with the processor, wherein the computer code is configured to:
   provide trust relationship information for a telephone number, the trust relationship information indicative of whether at least one node considers a target node as including or as being associated with a Voice-over-Internet-Protocol (VoIP) call agent for the telephone number based on a determination, at the at least one node, that at least one public switched telephone network (PSTN) call to the telephone number arrived at the VoIP call agent, the determination made in response to receipt, from the target node, of demonstrated knowledge of at least one attribute of the at least one PSTN call that demonstrates knowledge of the PSTN call; and
   determine a target trust relationship from a validating node to the target node based on the trust relationship information, wherein the target trust relationship indicates a level of trust the validating node has in the target node being associated with or including the VoIP call agent for the telephone number, wherein the validating node and the at least one node are in different respective administrative domains of a network.

2. The system of claim 1, wherein the computer code configured to determine the target trust relationship is further configured to determine the target trust relationship based on a reputation of the target node.

3. The system of claim 2, wherein the at least one node includes a plurality of nodes, and wherein the computer code is further configured to determine the reputation of the target node based on a number of the plurality of nodes that consider the target node as including or as being associated with the VoIP call agent for the telephone number based on the demonstrated knowledge of the at least one PSTN call initiated to the telephone number over the PSTN.

4. The system of claim 1, wherein the computer code configured to determine the target trust relationship is further configured to determine the target trust relationship based on the trust relationship information and at least one trust relationship with the at least one node, the at least one trust relationship not included in the trust relationship information.

5. The system of claim 4, wherein the at least one trust relationship includes a trust-blanket relationship to any one of the at least one node.

6. The system of claim 2, wherein the telephone number is a first telephone number, the at least one PSTN call is at least one first PSTN call, and the computer code is further configured to determine the reputation of the target node based on how many nodes consider the target node as including or as being associated with the VoIP call agent for a second telephone number, the second telephone number applicable to the same geographic area as the first telephone number.

7. The system of claim 1, wherein the computer code is further configured to validate an identity of the VoIP call agent for the telephone number based on the target trust relationship.

8. Logic encoded in one or more tangible non-transitory media for execution with a processor and when executed operable to:
   generate trust relationship information for a telephone number, the trust relationship information including an indication that at least one node considers a target node as including or as being associated with a Voice-over-Internet-Protocol (VoIP) call agent for the telephone number based on a determination, at the at least one node, that at least one public switched telephone network (PSTN) call to the telephone number arrived at the VoIP call agent, the determination made in response to receipt, from the target node, of demonstrated knowledge of at least one attribute of the at least one PSTN call that demonstrates knowledge of the PSTN call; and determine a target trust relationship to the target node from the trust relationship information, wherein the target trust relationship indicates a degree to which a validating node trusts the target node as being associated with or including the VoIP call agent for the telephone number, and the validating node and the at least one node are in separate administrative domains.

9. The one or more tangible media of claim 8, wherein the logic operable to determine the target trust relationship is operable to determine a reputation of the target node and to determine the target trust relationship from the reputation of the target node.

10. The one or more tangible computer-readable media of claim 9, wherein the at least one node includes a plurality of nodes, and wherein the logic operable to reputation of the target node is further operable to determine the reputation of the target node based on how many of the plurality of nodes are in different administrative domains.

11. The one or more tangible computer-readable media of claim 8, wherein the logic operable to determine the target trust relationship is further operable to determine the target trust relationship based on whether the validating node has a blanket-trust relationship to any one of the at least one node.

12. The one or more tangible computer-readable media of claim 8, wherein the logic operable to determine the target trust relationship is further operable to determine the target trust relationship based on a chain of trust relationships from the validating node to the at least one node.

13. The one or more tangible computer-readable media of claim 8, wherein the logic is further operable to determine whether to accept at least one VoIP call from a administrative domain including the target node based on the target trust relationship.

14. A method comprising:

providing at least a portion of trust relationship information for a telephone number, the trust relationship information indicating that at least one node considers a target node as including or as being associated with a Voice-over-Internet Protocol (VoIP) call agent for the telephone number based on a determination, at the at least one node, that at least one public switched telephone network (PSTN) call to the telephone number arrived at the VoIP call agent, the determination made in response to receipt, from the target node, of demonstrated knowledge of at least one attribute of the at least one PSTN call that demonstrates knowledge of the PSTN call; and validating an identity of the target node for the telephone number based on a target trust relationship, the target trust relationship determined from the at least a portion of the trust relationship information, the target trust relationship indicating a level of trust that a validating node has in the target node being associated with or including the VoIP call agent for the telephone number, the validating node and the at least one node being in a first administrative domain and a second administrative domain, respectively.

15. The method of claim 14, further comprising determining the target trust relationship based on a reputation of the target node.

16. The method of claim 15, further comprising determining the reputation of the target node based on a number of nodes included in the at least one node.

17. The method of claim 16, wherein the trust relationship information further indicates how many nodes consider the target node as failing to include or to be associated with the VoIP call agent for the telephone number, and wherein determining the reputation of the target node further comprises determining whether the number of nodes included in the at least one node outweighs how many nodes consider the target node as failing to include or to be associated with the VoIP call agent for the telephone number.

18. The method of claim 15, further comprising determining the reputation of the target node based on the number of administrative domains that include the at least one node.

19. The method of claim 14, further comprising determining the target trust relationship based on whether the validating node is configured to blanket trust the at least one node.

20. The method of claim 14, further comprising determining the target trust relationship at the validating node from the at least a portion of the trust relationship information without an identity of the target node by receiving the identity of the target node from the at least one node as a result of a configured trust relationship existing between the validating node and the at least one node.

* * * * *